United States Patent
Bergstrom

(10) Patent No.: US 11,846,305 B2
(45) Date of Patent: *Dec. 19, 2023

(54) SUBMERGED REVERSE OSMOSIS SYSTEM

(71) Applicant: Natural Ocean Well Co., Culver City, CA (US)

(72) Inventor: Robert A. Bergstrom, Culver City, CA (US)

(73) Assignee: NATURAL OCEAN WELL CO., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,059

(22) Filed: Nov. 15, 2021

(65) Prior Publication Data

US 2022/0074431 A1 Mar. 10, 2022

Related U.S. Application Data

(63) Continuation of application No. 16/484,323, filed as application No. PCT/US2018/017599 on Feb. 9, 2018, now Pat. No. 11,174,877.

(Continued)

(51) Int. Cl.
  *B01D 61/02* (2006.01)
  *B01D 61/08* (2006.01)
  (Continued)

(52) U.S. Cl.
  CPC ............ *F04F 1/08* (2013.01); *B01D 61/025* (2013.01); *B01D 61/08* (2013.01); *B01D 61/10* (2013.01); *B01D 65/02* (2013.01); *B01D 65/08* (2013.01); *C02F 1/001* (2013.01); *C02F 1/441* (2013.01); *C02F 1/76* (2013.01); *C02F 1/78* (2013.01); *B01D 2311/04* (2013.01); *B01D 2311/08* (2013.01); *B01D 2311/20* (2013.01); *B01D 2311/2661* (2013.01); *B01D 2313/12* (2013.01);
  (Continued)

(58) Field of Classification Search
  CPC .......... B01D 61/025; B01D 2311/2661; B01D 2315/06; C02F 1/441; F04F 1/08; F04F 1/20
  See application file for complete search history.

(56) References Cited

U.S. PATENT DOCUMENTS 1,825,631 A 9/1931 Horvath
2,864,506 A 12/1958 Hiskey
(Continued)

FOREIGN PATENT DOCUMENTS

CN 100572821 C 12/2009
CN 202860208 U 4/2013
(Continued)

OTHER PUBLICATIONS

U.S. Appl. No. 16/484,363, filed Aug. 7, 2019.
(Continued)

*Primary Examiner* — Bradley R Spies
(74) *Attorney, Agent, or Firm* — Patterson Thuente, P.A.

(57) ABSTRACT

A submerged offshore reverse osmosis desalination apparatus and method uses product water from the apparatus and an onshore cooler or heat exchanger to provide or improve the cooling of a Sea Water Air Conditioning (SWAC) system, power plant, data center, Ocean Thermal Energy Conversion (OTEC) system, or Rankine Cycle heat engine.

22 Claims, 9 Drawing Sheets

Related U.S. Application Data

(60) Provisional application No. 62/457,034, filed on Feb. 9, 2017.

(51) Int. Cl.
| | |
|---|---|
| *B01D 61/10* | (2006.01) |
| *C02F 1/00* | (2023.01) |
| *C02F 1/44* | (2023.01) |
| *C02F 103/08* | (2006.01) |
| *F04F 1/08* | (2006.01) |
| *B01D 65/02* | (2006.01) |
| *B01D 65/08* | (2006.01) |
| *C02F 1/76* | (2023.01) |
| *C02F 1/78* | (2023.01) |
| *C02F 103/00* | (2006.01) |
| *F04F 1/20* | (2006.01) |

(52) U.S. Cl.
CPC .... *B01D 2313/243* (2013.01); *B01D 2315/06* (2013.01); *B01D 2317/04* (2013.01); *B01D 2321/04* (2013.01); *C02F 2103/007* (2013.01); *C02F 2103/08* (2013.01); *C02F 2209/03* (2013.01); *C02F 2209/22* (2013.01); *C02F 2209/40* (2013.01); *C02F 2303/20* (2013.01); *F04F 1/20* (2013.01)

(56) References Cited

U.S. PATENT DOCUMENTS

| | | |
|---|---|---|
| 2,987,472 A | 6/1961 | Smart |
| 3,060,119 A | 10/1962 | Carpenter |
| 3,133,132 A | 5/1964 | Loeb et al. |
| 3,133,137 A | 5/1964 | Loeb et al. |
| 3,156,645 A | 11/1964 | Chapin et al. |
| 3,168,467 A | 2/1965 | Dreyer |
| 3,171,808 A | 3/1965 | Todd |
| 3,342,728 A | 9/1967 | Malm |
| 3,355,382 A | 11/1967 | Huntington |
| 3,367,504 A | 2/1968 | Westmoreland |
| 3,417,870 A | 12/1968 | Bray |
| 3,456,802 A | 7/1969 | Cole |
| 3,969,834 A | 7/1976 | Geier et al. |
| 4,040,486 A | 8/1977 | Kirkland, Jr. |
| 4,125,463 A | 11/1978 | Chenoweth |
| 4,135,364 A | 1/1979 | Busick |
| 4,311,012 A | 1/1982 | Finley |
| 4,334,992 A | 6/1982 | Von Bonin et al. |
| 4,335,576 A | 6/1982 | Hopfe |
| 4,352,736 A | 10/1982 | Ukai et al. |
| 4,363,703 A | 12/1982 | ElDifrawi et al. |
| 4,414,114 A | 11/1983 | Drude et al. |
| 4,455,232 A | 6/1984 | Reid |
| 4,512,886 A | 4/1985 | Hicks et al. |
| 4,595,460 A | 6/1986 | Hurt |
| 4,666,377 A | 5/1987 | Brown |
| 4,770,775 A | 9/1988 | Lopez |
| 4,808,287 A | 2/1989 | Hark |
| 5,192,434 A | 3/1993 | Moller |
| 5,229,005 A | 7/1993 | Fok et al. |
| 5,366,635 A | 11/1994 | Watkins |
| 5,620,605 A | 4/1997 | Moller |
| 5,651,894 A | 7/1997 | Boyce et al. |
| 5,788,858 A | 8/1998 | Acemese et al. |
| 5,914,041 A | 6/1999 | Chancellor |
| 5,944,999 A | 8/1999 | Chancellor et al. |
| 5,972,216 A | 10/1999 | Acemese et al. |
| 5,980,751 A | 11/1999 | Chancellor |
| 6,074,551 A | 6/2000 | Jones et al. |
| 6,149,393 A | 11/2000 | Chancellor |
| 6,187,202 B1 | 2/2001 | Fish |
| 6,348,148 B1 | 2/2002 | Bosley |
| 6,540,487 B2 | 4/2003 | Polizos et al. |
| 6,656,352 B2 | 12/2003 | Bosley |
| 6,800,201 B2 | 10/2004 | Bosley |
| 7,052,582 B2 | 5/2006 | Madkour |
| 7,713,032 B2 | 5/2010 | Davis, Sr. |
| 7,731,847 B2 | 6/2010 | Ton That |
| 8,206,589 B2 | 6/2012 | Voutchkov |
| 8,282,823 B2 | 10/2012 | Acemese et al. |
| 8,282,836 B2 | 10/2012 | Feher |
| 8,685,252 B2 | 4/2014 | Vuong et al. |
| 9,227,159 B2 | 1/2016 | Dufresne et al. |
| 9,861,937 B2 | 1/2018 | Benton et al. |
| 9,964,113 B2 | 5/2018 | Westberg et al. |
| 10,060,296 B2 | 8/2018 | Friesth |
| 10,151,318 B2 | 12/2018 | Westberg et al. |
| 10,662,084 B2 | 5/2020 | Constantz |
| 2005/0184008 A1 | 8/2005 | Schacht |
| 2005/0218074 A1 | 10/2005 | Pollock |
| 2006/0065597 A1 | 3/2006 | Kunczynski |
| 2007/0068160 A1* | 3/2007 | Jagusztyn ............... F03G 7/04 |
| | | 62/260 |
| 2008/0025852 A1 | 1/2008 | Davis |
| 2008/0156731 A1 | 7/2008 | Gordon |
| 2008/0190849 A1 | 8/2008 | Vuong |
| 2009/0078401 A1 | 3/2009 | Cichanowicz |
| 2010/0116726 A1 | 5/2010 | Dwek et al. |
| 2010/0270236 A1 | 10/2010 | Scialdone |
| 2010/0276369 A1 | 11/2010 | Haag |
| 2011/0048921 A1 | 3/2011 | Cap et al. |
| 2011/0277842 A1 | 11/2011 | Blumenthal |
| 2011/0297595 A1 | 12/2011 | Wallace |
| 2012/0247149 A1 | 10/2012 | Labelle |
| 2013/0042612 A1 | 2/2013 | Shapiro et al. |
| 2014/0076807 A1 | 3/2014 | Chidambaran |
| 2014/0105765 A1 | 4/2014 | Tonnessen |
| 2015/0144562 A1* | 5/2015 | Constantz .......... H05K 7/20836 |
| | | 210/170.11 |
| 2015/0166371 A1 | 6/2015 | Escher et al. |
| 2016/0257576 A1 | 9/2016 | Hoz |
| 2017/0028356 A1 | 2/2017 | Motherway et al. |
| 2017/0306966 A1 | 10/2017 | Valland et al. |

FOREIGN PATENT DOCUMENTS

| | | |
|---|---|---|
| EP | 2 302 201 A2 | 3/2011 |
| GB | 2 068 774 A | 8/1981 |
| JP | H 07-317508 A | 12/1995 |
| JP | 2016-150273 A | 8/2016 |
| RU | 2417333 C2 | 4/2011 |
| WO | WO 00/41971 | 7/2000 |
| WO | WO 2006/006942 A1 | 1/2006 |
| WO | WO 2009/086587 A1 | 7/2009 |

OTHER PUBLICATIONS

Smith, S., API Gas Lift Design Course, Workshop Clegg & Smith, 200 pages (2007).
Water Quality Control Plan, Ocean Waters of California, California Water Boards, 103 pages (2015).
Codeline® 80E Series, Pentair, 1 page (2015).
Dashtpour Reza, et al., Energy Efficient Reverse Osmosis Desalination Process, International Journal of Environmental Science and Development, vol. 3, No. 4 7 pages (Aug. 2012).
Dow Filmtec™ SW30HR-380 Element, Product Data Sheet, DOW®, 3 pages (Nov. 2015).
François et al., A physically based model for air-lift pumping, Water Resources Research, vol. 32, No. 8, pp. 2383-2399 (Aug. 1996).
SeaPRO* Series 50 Hz, Fact Sheet, GE Power & Water, Water & Process Technologies, 3 pages (Jul. 2013).
Hanafizadeh, P. and Ghorbani B., Review study on airlift pumping systems, Multiphase Science and Technology, 24 (4): pp. 323-362 (2012).
Miller, Google using sea water to cool Finland project, DataCenter Knowledge, 3 pgs., Sep. 2010.
Nenes, A. et al., Simulation of Airlift Pumps for Deep Water Wells, The Canadian Journal of Chemical Engineering, vol. 74, pp. 448-456 (Aug. 1996).

(56) References Cited

OTHER PUBLICATIONS

Nenes, A. et al., Simulation of Airlift Pumps for Moderate-Depth Water Wells, Published in Technika Chronika, 14, 1-20, 45 pages (1996).

Pacenti, P. et al., Submarine seawater reverse osmosis desalination system, Desalination, 126, pp. 213-218 (1999).

Riglin, Jacob D., Performance Characteristics of Airlift Pumps with Vortex Induced by Tangential Fluid Injection, Bucknell University, Bucknell Digital Commons, 65 pages (2011).

Pougatch, K. et al., Numerical modeling of deep sea air-life, Ocean Engineering, 35, pp. 1173-1182 (2008).

Usage Guidelines for DOW FILMTEC™ 8" Elements, Tech Fact, DOW®, 1 page (Aug. 2015).

Water Desalination Report, The international weekly for desalination and advanced water treatment since 1965, vol. 54, No. 44, 3 pages (Nov. 26, 2018).

Real Results, Xtra-Lift™ Gas-Lift System Significantly Improves Production, Allows Operator to Produce Wells to Depletion, Weatherford® International Ltd., 1 page (2007).

Gas-Lift Equipment Catalog, Weatherford® International plc, 104 pages (2014).

Zukoski, E.E., Influence of viscosity, surface tension, and inclination angle on motion of long bubbles in closed tubes, J. Fluid Meeh., vol. 25, part 4, pp. 821-837 (1966).

\* cited by examiner

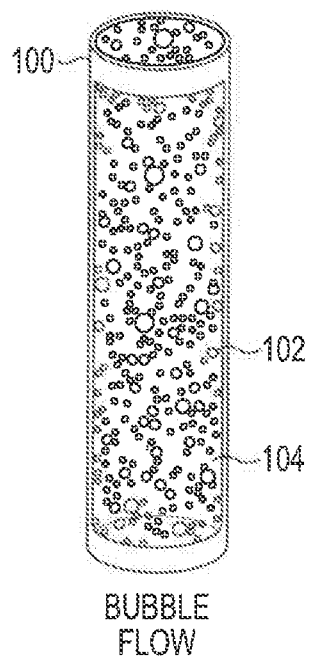 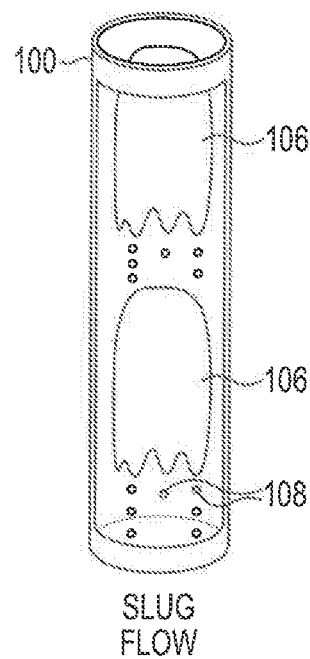 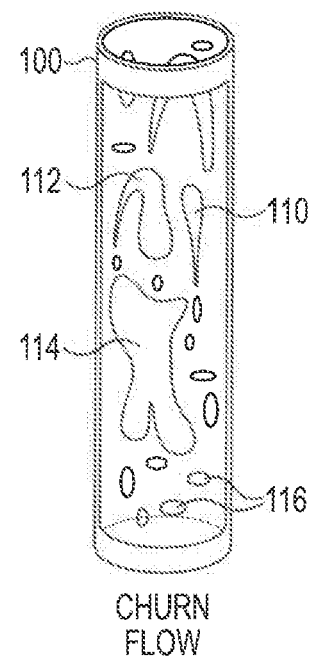
Fig. 1a  Fig. 1b  Fig. 1c
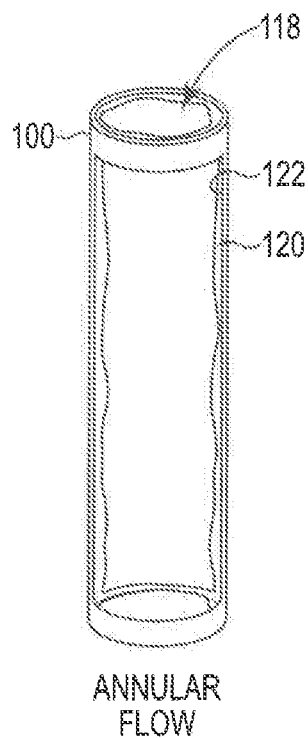 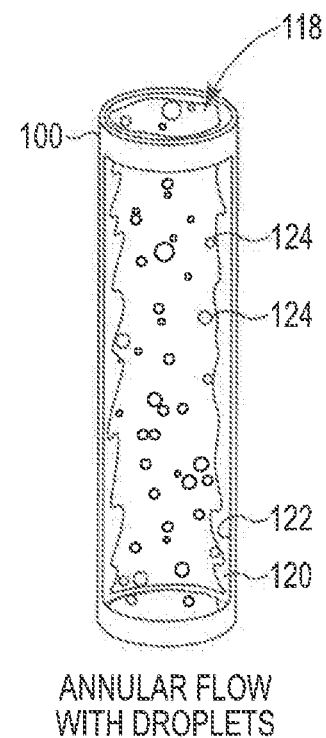
Fig. 1d  Fig. 1e

STRATIFIED-SMOOTH
FLOW

STRATIFIED-WAVY
FLOW

BUBBLE
FLOW

ELONGATED BUBBLE
FLOW

SLUG
FLOW

ANNULAR
FLOW

SLUG FLOW

ANNULAR FLOW

SUBMERGED REVERSE OSMOSIS SYSTEM

CROSS REFERENCE TO RELATED APPLICATIONS

This application is a continuation of U.S. application Ser. No. 16/484,323 filed Aug. 7, 2019 (now U.S. Pat. No. 11,174,877 B2), which is a national stage filing under 35 U.S.C. § 371 of International Application No. PCT/US2018/017.5.99 filed Feb. 9, 2018, which claims priority to U.S. Provisional Application No. 62/457,034 filed Feb. 9, 2017, each entitled "SUBMERGED REVERSE OSMOSIS SYSTEM", and the disclosures of each of which are incorporated herein by reference in their entirety.

TECHNICAL FIELD

This invention relates to water desalination.

BACKGROUND ART

The growth of saltwater (e.g., seawater) desalination has been limited by the relatively high cost of desalinated water. This high cost is due in part to energy and capital expenses associated with current desalination systems. Such systems typically employ an onshore facility containing reverse osmosis (RO) desalination membranes contained in high-pressure corrosion-resistant housings and supplied with seawater from a submerged offshore intake system. Very high pressures typically are required to drive water through the RO membranes. For example, the widely-used Dow FILMTEC™ SW30HR-380 reverse osmosis membrane elements (Dow Chemical Co.) require an 800 psi (55 bar) pressure differential across the membrane to meet design requirements. In addition to such high pressures, onshore RO units suffer from high power demands, primarily for pressurizing the feedwater to membrane operating pressures, and for an onshore RO unit typically average about 13.5 kWh per thousand gallons of produced fresh water. The seawater and the concentrated brine stream produced by a typical onshore RO unit have high corrosion potential and consequently require expensive components and equipment. The highly-pressurized water flow also increases maintenance expenses. Onshore RO units typically also require significant amounts of expensive seaside real estate. Shore-based desalination has in addition been criticized for various environmental impacts, including entrainment of marine life in the intake water, greenhouse gas production associated with producing the energy required, discharge of a strong brine stream with the potential to harm marine life, and the use of treatment chemicals that may enter the ocean.

In the 50 years since the invention of semi-permeable RO membranes, various concepts for submerging such membranes and employing natural hydrostatic water pressure to help desalinate seawater been proposed. Representative examples include the systems shown in U.S. Pat. No. 3,456,802 (Cole), U.S. Pat. No. 4,125,463 (Chenowith), U.S. Pat. No. 5,229,005 (Fok et al.), U.S. Pat. No. 5,366,635 (Watkins), U.S. Pat. No. 5,914,041 (Chancellor '041), U.S. Pat. No. 5,944,999 (Chancellor '999), U.S. Pat. No. 5,980,751 (Chancellor '751) and U.S. Pat. No. 6,348,148 B1 (Bosley), US Patent Application Publication Nos. 2008/0190849 A1 (Vuong) and 2010/0270236 A1 (Scialdone), GB Patent No. 2 068 774 A (Mesple) and International Application No WO00/41971 A1 (Gu). An experimental system is described in Pacenti et al., *Submarine seawater reverse osmosis desalination system*, Desalination 126, pp. 213-18 (November, 1999). It appears however that submerged RO systems (SRO systems) have not been placed in widespread use, due in part to factors such as the energy cost of pumping the desalinated water to the surface from great depth and the difficulty of maintaining mechanical moving parts at depth.

From the foregoing, it will be appreciated that what remains needed in the art is an improved system for RO desalination featuring one or more of lower energy cost, lower capital cost, lower operating cost or reduced environmental impact. Such systems are disclosed and claimed herein.

SUMMARY OF THE INVENTION

This invention provides in one aspect a submersible reverse osmosis desalination apparatus comprising (i) one or more osmotic membranes each having an inlet surface and an outlet surface, (ii) a product water collector in fluid communication with the outlet surface(s), and (iii) an air supply for removing water from the collector via airlift, wherein during submerged operation of the apparatus the inlet surface(s) are supplied with saltwater at least partially and preferably solely under hydrostatic pressure, the outlet surface(s) provide desalinated water to the collector, the collector is in fluid communication with an at least partially submerged water discharge conduit, and the air supply lifts desalinated water from the collector through the conduit in an annular flow regime over a significant portion (e.g., 10% or more) of the airlift depth.

The invention provides in another aspect a method for submerged reverse osmosis desalination, the method comprising supplying air to a submerged reverse osmosis desalination apparatus comprising (i) one or more osmotic membranes each having an inlet surface supplied with seawater at least partially under hydrostatic pressure and an outlet surface that provides desalinated water, and (ii) a product water collector receiving desalinated water from the outlet surface(s) and in fluid communication with an at least partially submerged water discharge conduit, wherein the air supply lifts desalinated water from the collector through the conduit in an annular flow regime over a significant portion of the airlift depth.

BRIEF DESCRIPTION OF THE DRAWING

FIG. 1a through FIG. 1e schematically depict various airlift pump flow regimes in a vertical discharge conduit;

Like reference symbols in the various figures of the drawing indicate like elements. The elements in the drawing are not to scale.

DETAILED DESCRIPTION

Figure 2A:
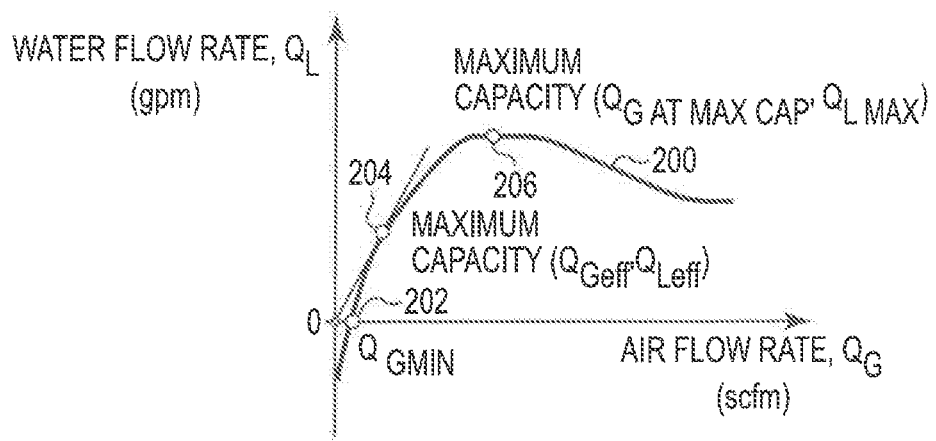
FIG. 2a and FIG. 2b are graphs illustrating efficiency, capacity and recommended operating conditions for pumping liquids using an airlift pump.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, an apparatus that contains "a" filter membrane includes "one or more" such membranes.

The term "air fraction" when used with respect to a two-phase air:liquid (e.g., air:water) flow through a conduit refers to the volumetric fraction, expressed as a percentage, of the air volume over the length of the conduit compared to the conduit volume, with the conduit length and volume referring to the total length and total volume unless otherwise specified. Expressed somewhat differently, the air fraction for such a two-phase flow refers to the air volume as a percent of the total volume of air plus liquid in the conduit.

The term "airflow rate" when used with respect to an airlift pump supplied by an air compressor refers to the volumetric airflow measured at the compressor outlet. There are many possible ways to define compressor operating conditions and specifications (e.g., based on outlet pressure, flow and temperature). Airflow rates at any given set of conditions and specifications can be converted, using well known relationships, to airflow rates at other conditions and specifications. If not otherwise specified herein, airflow rates are measured in units of 28.3 Liters (1 cubic foot) per minute at 1 atmosphere (14.73 psi, 1 bar or 100,000 Pascals) and 5-10° F. (41-50° C.). The resulting rates will be numerically somewhat lower than standard cubic feet per minute (sfcm) rates determined at 70° F. (21° C.), but will be used in recognition of the typical temperatures that will be encountered at the expected operating depths.

The term "airlift" when used with respect to a pump refers to a device or method for pumping a liquid or slurry by injecting air (and preferably only by injecting air) into the liquid or slurry.

The term "annular flow" when used with respect to a two-phase flow regime in a conduit refers to a regime in which liquid (e.g., water) flows primarily as a film along the conduit wall and gas (e.g., air) flows primarily as a separate phase in the center of the conduit. The gas phase may contain entrained droplets of liquid, in which case the flow regime may be referred to as "annular flow with droplets" but can still be regarded as an annular flow regime.

The term "brine" refers to an aqueous solution containing more sodium chloride than that found in typical saltwater, viz., more than about 3.5% sodium chloride.

The term "bubble flow" when used with respect to a two-phase flow regime in a conduit refers to a regime in which gas (e.g., air) primarily flows as small bubbles within a continuous liquid (e.g., water) phase flowing through the conduit. The bubbles may be very small, in which case the flow regime may be referred to as "dispersed bubble flow" or "finely dispersed bubble flow" but may still be regarded as a bubble flow regime.

The term "churn flow" when used with respect to a two-phase flow regime in a conduit refers to a regime between slug flow and annular flow in which large bubbles of gas (e.g., air), typically having a diameter near the diameter of the conduit and a length ranging up to several times the diameter, flow through the conduit in a chaotic and disordered flow pattern along with liquid that may contain numerous small bubbles.

The term "conduit" refers to a pipe or other hollow structure (e.g., a bore, channel, duct, hose, line, opening, passage, riser, tube or wellbore) through which a liquid flows during operation of an apparatus employing such conduit. A conduit may be but need not be linear, and may for example have other shapes including branched, coiled or radiating outwardly from a central hub.

The term "depth" when used with respect to an airlift pump (or to a component of a submerged apparatus) refers to the vertical distance, viz., to the height of a water column, from the free surface of a body of water in which the pump or component is submerged to the point of pump air introduction or to the location of the component.

The terms "desalinated water" and "fresh water" refer to water containing less than 0.5 parts per thousand (ppt) dissolved inorganic salts by weight. Exemplary such salts include sodium chloride, magnesium sulfate, potassium nitrate, and sodium bicarbonate.

The terms "efficiency" and "efficiency ratio" when used with respect to an airlift pump intended to pump liquids refer to the ratio of the water mass flow rate to the air mass flow rate. When the context indicates, efficiency may refer to the ratio of output pumping power to the required input power.

The terms "flow regime" or "flow pattern" when used with respect to two-phase flow from an airlift pump refer to the type and appearance of bubbles or other airflow along a specified length of the lift conduit. It will be appreciated that at constant airflow rates the flow regime will vary within any vertical conduit by depth, with the flow regime being less annular (or not annular at all) at the bottom of the conduit, and at sufficiently high airflow ratios becoming more annular or in some cases annular as the depth and the associated hydrostatic pressure in the conduit at that depth both decrease. It is important to note that at all depths there will be an advantage to the present invention in using an annular flow regime, due to a reduction in discharge conduit backpressure and a corresponding reduction in air compressor energy demand.

The term "lift height" when used with respect to an airlift pump refers to the vertical distance from the water surface to the point of discharge. For an airlift pump that discharges above the water surface, the lift height will be positive. For an airlift pump that discharges below the water surface, the lift height will be negative.

The term "maximum capacity" when used with respect to an airlift pump at a given submergence ratio refers to the maximum liquid discharge flow rate attainable with a given system configuration using air as the injection gas.

The term "maximum efficiency" when used with respect to an airlift pump at a given submergence ratio refers to the efficiency ratio for a given system configuration at which increased energy input provides a diminishing increase in water flow rate plotted on the y-axis in a two-dimensional Cartesian coordinate system (viz., the ordinate) per unit of additional airflow rate plotted on the x-axis (viz., the abscissa). This corresponds to an asymptote for such plot beyond which the slope (viz., the ratio of water flow rate to airflow rate) diminishes.

The terms "saltwater" and "seawater" refer to water containing more than 0.5 ppt dissolved inorganic salts by weight. In oceans, dissolved inorganic salts typically are measured based on Total Dissolved Solids (TDS), and typically average about 35,000 parts per million (ppm) TDS, though local conditions may result in higher or lower levels of salinity.

The term "slug flow" when used with respect to a two-phase flow regime in a conduit refers to a regime in which gas (e.g., air) primarily flows through the conduit as large bubbles, typically having a diameter at or near the diameter of the conduit and a length ranging from the diameter to several times the diameter, along with a liquid that may contain numerous small additional bubbles.

The term "submerged" means underwater.

The term "submergence" when used with respect to a submerged airlift pump refers to the vertical distance from the water surface to the (or an) air introduction point.

The term "submergence ratio" when used with respect to an airlift pump refers to the ratio of submergence to lift height.

The term "submersible" mean suitable for use and primarily used while submerged.

The term "superficial velocity" when used with respect to the flow of a fluid in a conduit refers to the volumetric flow rate Q (expressed for example in $m^3/s$) divided by the conduit cross-sectional area A (expressed for example in $m^2$). When used with respect to a two-phase flow regime (for example, an air:water flow regime), this definition can be applied to either phase and calculated to provide a hypothetical flow velocity for a particular phase as if such phase was the only phase flowing or present in a given cross-sectional area.

The term "two-phase" when used with respect to flowing substances refers to the simultaneous flow of such substances in two different phases, typically as a gas and a liquid.

The term "water flow rate" when used with respect to an airlift pump that pumps water refers to the volumetric airflow at the outlet from the pump discharge conduit.

The term "wide area" when used with respect to dispersal of a fluid (e.g., brine) away from a conduit having a plurality of fluid outlets (e.g., brine outlets) distributed along a length of the conduit, means dispersal into an area, and typically into a volume, encompassing at least 5 meters of such length. The disclosed area or volume will also have other dimensions (e.g., a width, diameter or height) that will depend in part upon the direction and velocities of fluid streams passing through the fluid outlets. Because such other dimensions will be affected by variable factors including fluid flow rates inside and outside the conduit, and the overall shape of the dispersed fluid plume, the term "wide area" has been defined by focusing merely on the recited length along the recited conduit, as such length typically will represent a fixed quantity in a given dispersal system.

Airlift pumping systems may be used for a variety of pumping tasks, including not only the pumping of water but also in undersea mining operations such as dredging the sea floor to recover gold nuggets or manganese nodules. "Gas lift" is a term commonly used in oil and gas production, including offshore and onshore applications, to raise desired gaseous or oily products to the surface. Airlift and gas lift systems can transport solids, e.g., the above-mentioned nuggets and nodules, sand, gold and the like. It is important to note that an annular flow regime cannot be used if solids are to be lifted. This is an important distinguishing feature from many previous air and gas lift situations where the lifting of solids along with a liquid must be achieved.

Airlift and gas lift systems normally are operated using air or gas and liquid flow rates selected to maximize the amount of desired product obtained per unit of pumping energy expended. For a two-phase system that transports air or another gaseous phase and a desired liquid product phase, maximum pumping efficiency typically arises when the average flow within the conduit carrying the desired liquid product to the surface represents a so-called "slug" or "churn" flow regime as discussed in more detail below. Further details regarding airlift pump flow regimes may be found for example in Francois et al., *A physically based model for airlift pumping*, Water Resources Research, 32, 8, pp. 2383-2399 (1996), Nenes et al., *Simulation of Airlift Pumps for Deep Water Wells*, Can. J. Chem. Eng., 74, 448-456 (August 1996) and Pougatch et al., *Numerical modeling of deep sea air-lift*, Ocean Engineering, 35, 1173-1182 (2008).

FIG. 1a through FIG. 1e schematically depict flow regimes that may arise in a vertical airlift system at increasing ratios of air mass flow to water mass flow. The discharge water conduit in an actual submerged airlift pump system may include a combination of vertical, horizontal or oblique sections. The nature of the flow regimes that might arise is however most easily understood by primarily considering the limiting situations represented by vertical and horizontal discharge conduits. FIG. 1a depicts "bubble" flow in a vertical conduit 100 in which air flows as small bubbles 102 dispersed in water 104. Although not shown in the Drawing, flow regimes that may be referred to as "finely dispersed bubble flow" or "dispersed bubble flow" could also be shown, in which the bubbles are generally smaller than bubbles 102. FIG. 1b depicts "slug" flow in which air flows primarily as large bubbles 106 and to a lesser extent as numerous small additional bubbles 108 within water 104. FIG. 1c depicts "churn" flow in which air flows in a chaotic and disordered flow pattern primarily as large bubbles such as bubbles 110, 112 and 114 and to a lesser extent as numerous small additional bubbles 116 within water 104. FIG. 1d depicts "annular" flow in which air flows primarily as a separate phase 118 in the center of conduit 100 and water flows primarily as a film 120 along the inner wall surface 122 of conduit 100. FIG. 1e depicts a further form of annular flow that may be referred to as "annular flow with droplets", in which air flows primarily as a separate phase 114 containing some entrained droplets 124 of water, but the water flows primarily as film 120 along inner wall surface 122.

Figure 2B:
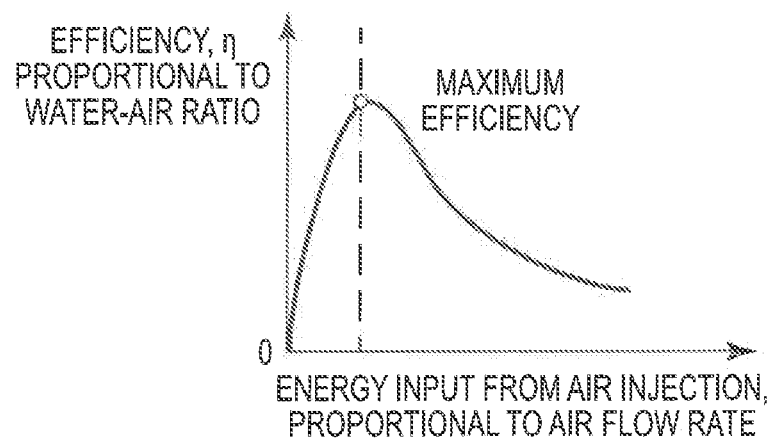

FIG. 2a shows a plot 200 of water flow rate $Q_L$ versus air flow rate $Q_G$ for a vertical airlift system. At a given lift height, there is a minimum air flow value 202 (designated in FIG. 2a as "$Q_{Gmin}$") that is required to maintain the initial flow of water at a steady state rate. As the air flow rate $Q_G$ and consequently the volume of air in the discharge water conduit are increased above $Q_{Gmin}$, the flow of liquid from the discharge water conduit and efficiency both initially increase. At an asymptote represented by point 204, the airlift pump efficiency, which corresponds to the slope $Q_G/Q_G$, reaches a maximum value designated as "$Q_{Geff}$, $Q_{Leff}$", and thereafter declines as the air flow rate increases further. FIG. 2b illustrates the pump efficiency η as a function of the energy input from air introduction, and shows the change in slope for curve 200 with increasing air flow rate $Q_G$. The point of maximum efficiency and the point of maximum capacity occur at different air flow rate values. For pumping liquids, experts in airlift pump design and operation normally recommend that the pump be operated between the points of maximum efficiency and maximum capacity. Annular flow is not the most efficient nor does it move the most water. Accordingly, its use as an operating regime is normally contraindicated.

Figure 3:
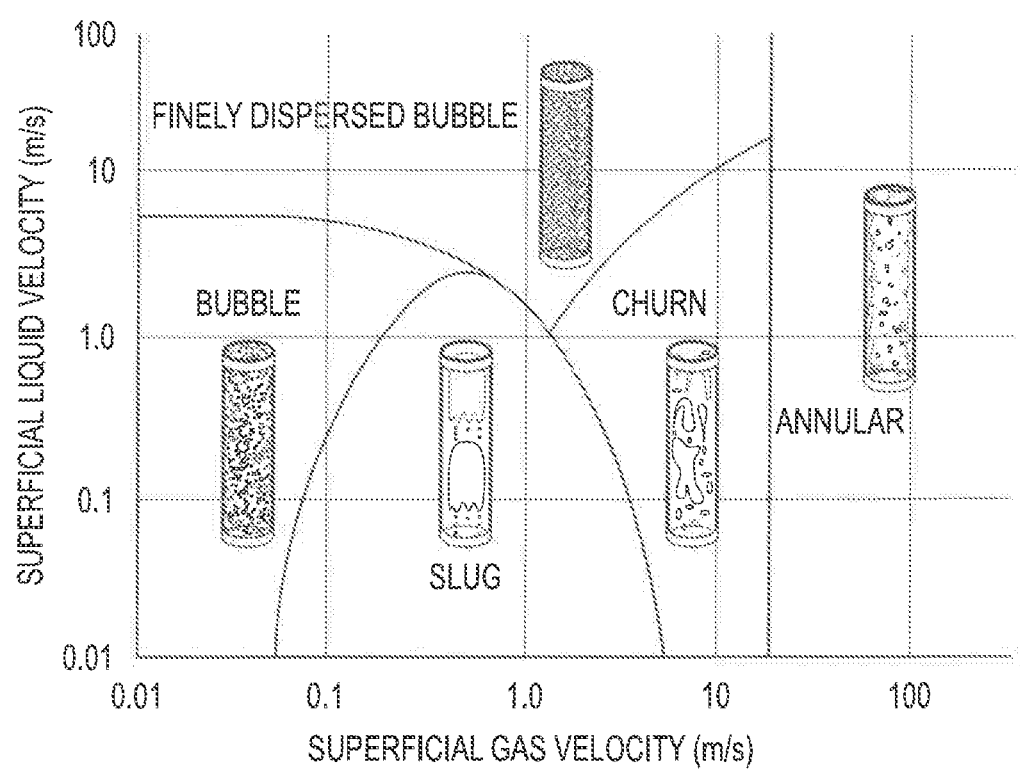
FIG. 3 depicts various flow regimes overlaid atop a graph of superficial liquid velocity vs. superficial gas velocity for a vertical airlift pump system operated over a range of air and liquid flow rates.

FIG. 3 depicts the FIG. 1a through FIG. 1e flow regimes overlaid atop a graph of superficial liquid velocity vs. superficial gas velocity for a vertical airlift pump system operated over a range of air and liquid flow rates. At small air flow rates and at liquid flow rates up to a superficial liquid velocity of about 5 m/s, the system operates in the FIG. 1a bubble flow regime. As the air flow rate increases, the bubbles coalesce to form large bubbles that drive a "slug" of water up the conduit in the FIG. 1b slug flow regime. Further airflow rate increases cause the large bubbles to become unstable and form the FIG. 1c churn flow regime. For a vertical conduit pumping liquids, the transition from maximum efficiency to maximum capacity (see FIG. 2a) occurs in the transition regime between slug flow and churn flow. At yet larger air flow rates, the FIG. 1d and FIG. 1e annular flow regimes arise.

Figure 4A:
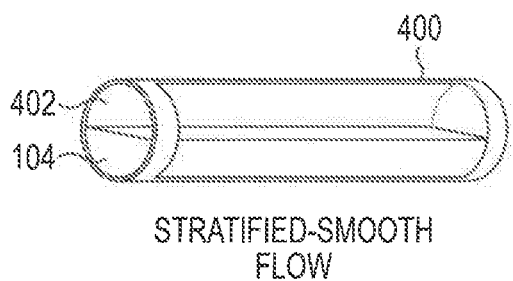
FIG. 4a through FIG. 4f schematically depict various airlift pump flow regimes in a horizontal discharge conduit.
Figure 4B:
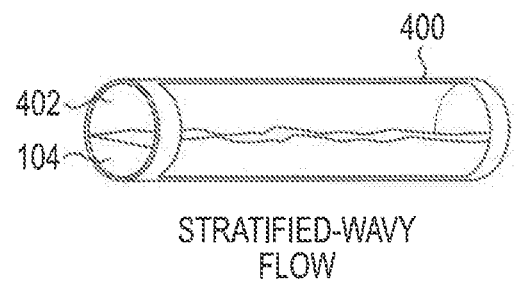
Figure 4C:
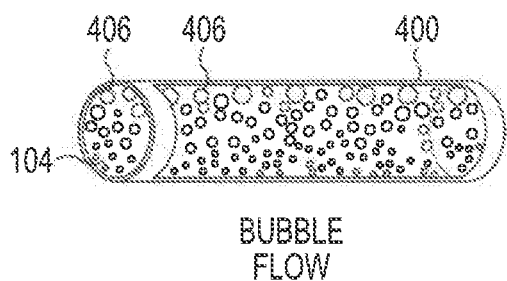
Figure 4D:
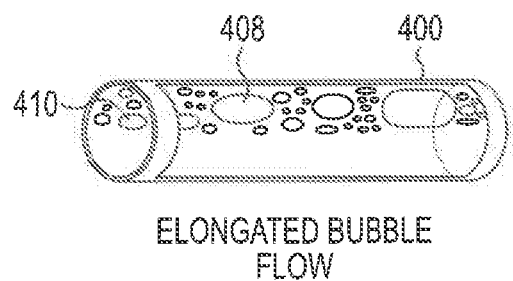
Figure 4E:
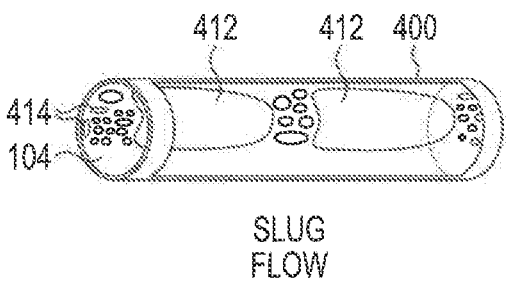
Figure 4F:
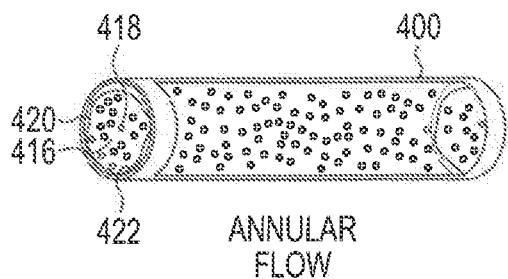

FIG. 4a through FIG. 4f schematically depict flow regimes that may arise in a horizontal discharge conduit at increasing airlift ratios of air mass flow to water mass flow. FIG. 4a depicts "stratified-smooth" flow in horizontal conduit 400 in which water 104 flows in a smooth stream under air 402. The FIG. 4a flow regime typically arises only at relatively low air and liquid velocities. At higher air velocities, waves form in the surface of water 104, providing the "stratified-wavy" flow regime shown in FIG. 4b. FIG. 4c depicts a higher air flow rate horizontal "bubble" flow regime in which air flows as small bubbles 406 dispersed in water 104. FIG. 4d depicts a yet higher air flow rate "elongated bubble" flow regime in which air flows primarily as elongated bubbles 408 together with smaller bubbles 410 dispersed in water 104. FIG. 4e depicts a horizontal "slug" flow regime in which air flows primarily as large bubbles 412 and to a lesser extent as numerous small additional bubbles 414 within water 104. FIG. 4f depicts horizontal "annular" flow in which air flows primarily as a continuous phase 416 in the center of conduit 400 and containing some small water droplets 418, with the majority of the water flowing as a film 420 along the inner wall surface 422 of conduit 400.

Figure 5:
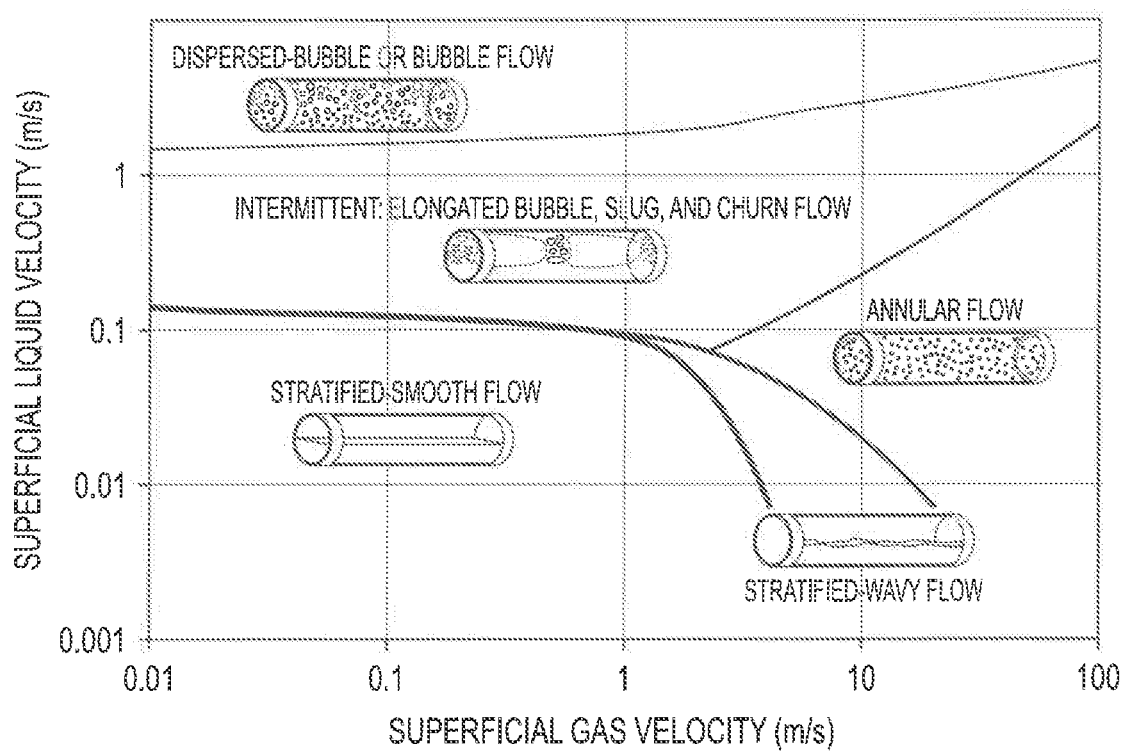
FIG. 5 depicts various flow regimes overlaid atop a graph of superficial liquid velocity vs. superficial gas velocity for a horizontal airlift pump system operated over a range of air and liquid flow rates.

FIG. 5 depicts the FIG. 4a through FIG. 4c, FIG. 4e and FIG. 4f flow regimes overlaid atop a graph of superficial liquid velocity vs. superficial gas velocity for a horizontal airlift pump system operated over a range of air and liquid flow rates. At small air flow rates and at liquid flow rates up to a superficial liquid velocity of about 0.1 m/s, the system operates in the FIG. 4a stratified-smooth flow regime. At somewhat higher air flow rates, the FIG. 4b stratified-wavy flow regime arises. As the water flow rate increases above that required to maintain a stratified-smooth flow regime, the FIG. 4c bubble flow regime eventually arises, with intermittent occurrence of the FIG. 4d elongated bubble flow and FIG. 4e slug flow regimes, as well as intermittent occurrence of a churn flow regime not shown in FIG. 4a through FIG. 4f. At very high air flow rates and over a relatively wide range of water flow rates, the FIG. 4f annular flow regime arises.

Air bubbles expand as the depth and hydrostatic pressure decrease. Thus for a vertical or oblique discharge conduit, the flow regime can vary along the discharge water conduit length, and may for example represent bubble flow at the maximum depth, slug flow or churn flow at intermediate depths and annular flow near the surface. In any event, annular flow is typically characterized as being highly undesirable, for example by providing "poor pumping efficiency" (see Nenes et al. at p. 448) or by rendering the air-lift "impossible" (see Pougatch et al. at p. 1174). Experts consequently do not recommend operating in an annular flow regime when pumping liquids, as doing so is relatively inefficient at best and under some conditions (e.g., when solids such as sand, rocks, or nodules are entrained in the liquid to be pumped) will not be possible. For example, entrained solids typically will be present in most oil and gas and all undersea mining applications, and consequently a slug or churn flow regime typically will be required in such applications.

Figure 6A:
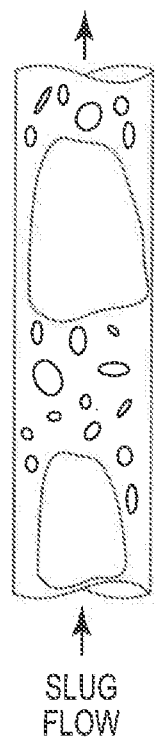
FIG. 6a and FIG. 6b are respectively schematic cross-sectional views of water pumped vertically by an airlift pump operating in a slug flow regime and in an annular flow regime.
Figure 6B:
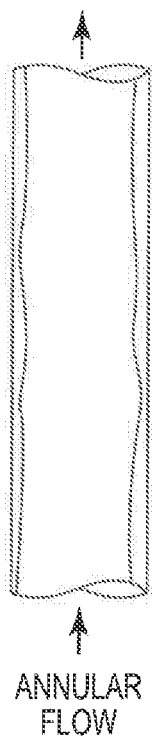

However, when operating an SRO desalination system equipped with an airlift pump to remove desalinated water, this conventional advice should be disregarded. FIG. 6a and FIG. 6b show in schematic cross-section a conventionally recommended slug flow regime, alongside a conventionally disparaged annular flow regime. An important difference between these two flow regimes is that the average weight of the water:air column in the FIG. 6a slug flow regime is substantially greater than the average weight of the air:water column in the FIG. 6b annular flow regime, as most of the volume in the latter flow regime is occupied by air. The reduced average water column weight provided by an annular flow regime significantly decreases backpressure at the bottom of the discharge water conduit. Such reduced backpressure correspondingly reduces the required delivery pressure (and for an SRO system that relies upon hydrostatic pressure, the required depth) needed to accomplish efficient reverse osmosis using conventional reverse osmosis membranes. For example, if conducting SRO using industry-standard Dow FILMTEC RO membrane elements and airlift without mechanical pump assist to remove product water, a depth of 680 m or more is preferred in order to provide sufficient hydrostatic pressure for permeation to take place through the membrane at the recommended 800 psi (55 bar) pressure differential across the membrane. A startup pressure of about 942 psi (65 bar) will be needed to initiate airlift pumping of the standing water column in the distribution conduit. However, if the air fraction is raised to about 80%, then an annular flow regime will be observable along a substantial portion of the discharge water conduit and the required continuous operating pressure (and the backpressure at the membrane outlet) will drop to about 188 psi (13 bar).

Once continuous desalination and continuous airlift commences, the backpressure on the downstream side of the osmotic membranes, at the bottom of the delivery conduit, preferably is less than about 580 psi (40 bar), less than about 435 psi (30 bar), less than about 290 psi (20 bar) or less than about 218 psi (15 bar).

The pressure, backpressure, air fraction and depth values set out above are recommended for use with Dow FILMTEC RO membrane elements. As discussed in more detail below, other RO membranes which have been or are yet to be developed may have different pressure requirements or different performance characteristics, and consequently might preferentially be used at other preferred depths or with other airlift values to attain SRO with an annular flow regime.

Pumping air at a rate sufficient to achieve an annular flow regime rather than a slug or churn flow regime has several consequences and effects. An annular flow regime airlift will transport water to the surface from the SRO system, but at lower pumping efficiency than the peak potential efficiency that might be attainable using a slug or churn flow regime.

However, as discussed above an annular flow regime also enables a significant backpressure reduction at the bottom of the airlift. This facilitates deploying and operating the RO membrane at a lesser depth than would otherwise be needed when using a slug or churn flow regime and no mechanical pumping. As discussed in more detail below, operation at a reduced depth is especially important because attaining greater depth typically requires operating further off shore.

The use of an annular flow regime airlift also helps oxygenate and cool the product water column. Both oxygenation and cooling are assisted by the large exposed water surface area present during an annular flow regime. The product water may be used for potable water, irrigation water, process water, water storage, water table replenishment, cooling or heat exchange, and for a variety of other desired uses that will be apparent to persons having ordinary skill in the art. For example, potential cooling or heat exchange applications include providing or improving the efficiency of air conditioning systems including Sea Water Air Conditioning (SWAC) systems; providing or improving power plant or data center cooling; operating or improving the efficiency of Ocean Thermal Energy Conversion (OTEC) systems; and operating or improving the efficiency of Rankine Cycle heat engines.

Figure 7:
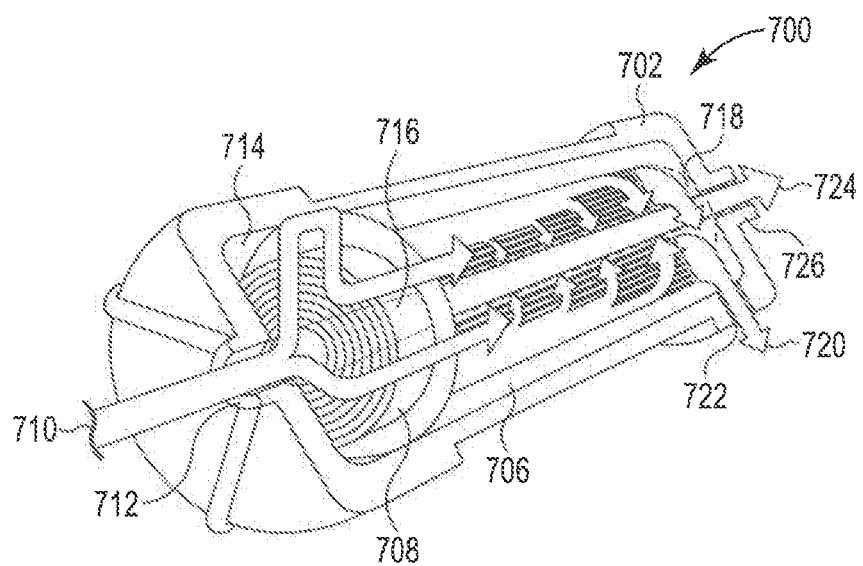
FIG. 7 and FIG. 8 are perspective views, partially cut away, of typical reverse osmosis membrane cartridges.

The disclosed SRO system may be constructed using a variety of readily-available components. FIG. 7 is a perspective view, partially cut away, of a typical reverse osmosis membrane cartridge. Cartridge 700 includes a surrounding pressure-resistant housing 702 encasing inner cylindrical housing 706 and spiral-wound membrane 708. Membrane 708 typically will have several individual layers arrayed in a sandwich, as discussed in more detail below. Saltwater 710 enters cartridge 700 through inlet 712, passes into inlet chamber 714, and then passes along the length of membrane 708 and laterally along its spiral winding. In the course of doing so desalinated water is separated from its salts by membrane 708 and enters porous central collection tube 716. Concentrated brine that does not pass through the membrane is collected at outlet chamber 718, then removed as brine waste stream 720 via brine outlet 722. Desalinated water exits collection tube 716 as stream 724 via outlet 726. Typically, an SRO system or other reverse osmosis apparatus will employ a plurality of such cartridges in series, will collect desalinated water from each of them in a collector (not shown in FIG. 7) and then will remove desalinated water from the collector by pumping it through a delivery conduit (also not shown in FIG. 7).

Figure 8:
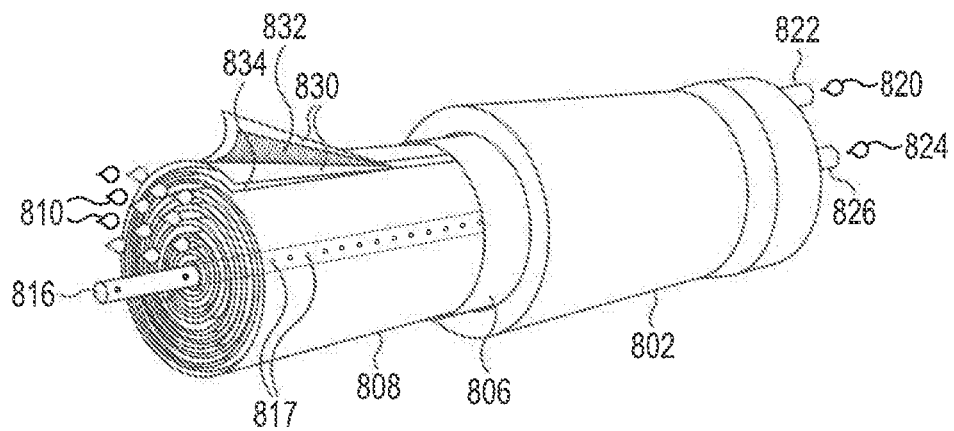

FIG. 8 is a perspective view, partially cut away, of another typical reverse osmosis membrane cartridge. As is the case for the generally similar cartridge shown in FIG. 7, cartridge 800 includes surrounding pressure-resistant housing 802 encasing inner cylindrical housing 806 and spiral-wound membrane 808. Saltwater 810 enters cartridge 800 through an inlet (not shown in FIG. 8) and passes along the length of membrane 808 and laterally along its spiral winding. In the course of doing so desalinated water is separated from its salts by membrane 808 and enters central collection tube 816 through perforations 817. Concentrated brine that does not pass through the membrane is removed as brine waste stream 820 via brine outlet 822. Desalinated water exits collection tube 816 as stream 824 via outlet 826. Membrane 808 includes several individual layers arrayed in a sandwich. Fabric backing layers 830 include a salt-rejecting coating that enables passage of water molecules through the coating while blocking the passage of salt ions. Grooved plasticized fabric 832 provides spiral channels that conduct desalinated water to perforations 817 and thence into collection tube 816. Fabric brine spacer 834 provides a pathway for brine to travel the length of membrane 808 toward brine outlet 822.

Figure 9:
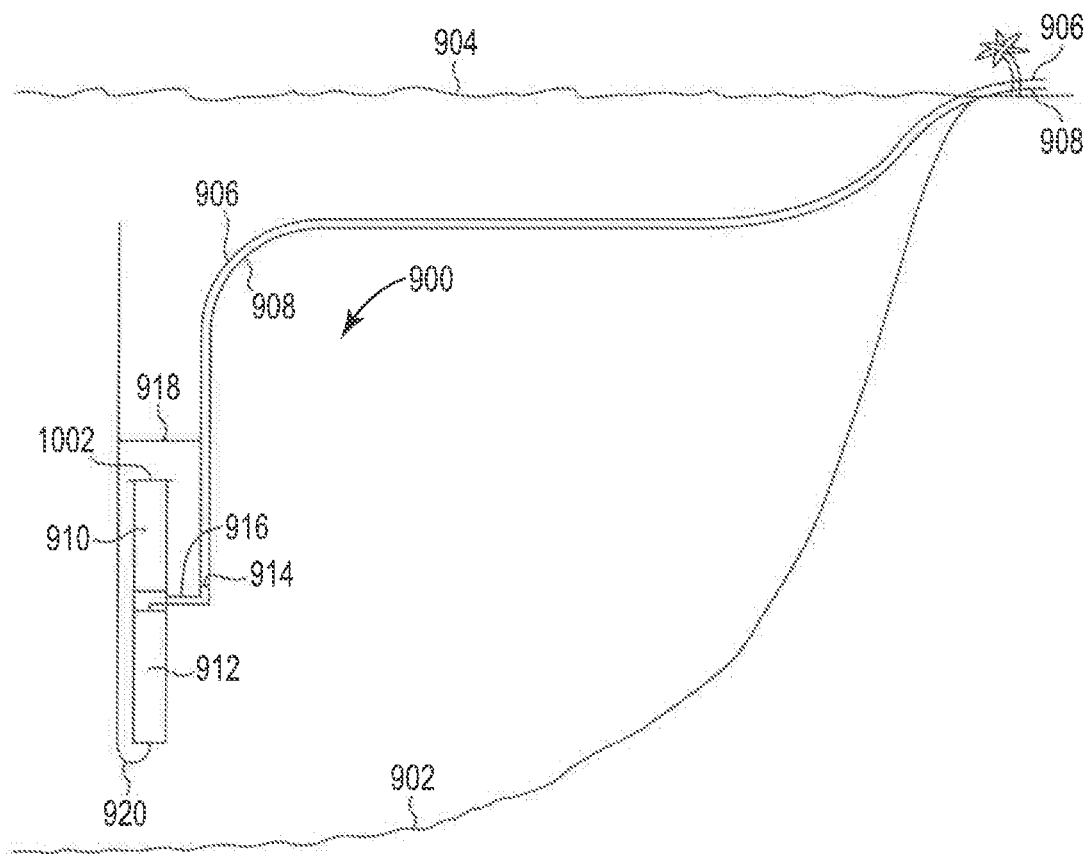
FIG. 9 and FIG. 10 are schematic sectional views of an SRO desalination system.

FIG. 9 is a schematic view of one embodiment of the disclosed SRO desalination system. System 900 is submerged in saltwater at an appropriate depth between seafloor 902 and sea surface 904. System 900 may if desired rest upon or be anchored to seafloor 902. In another embodiment, system 900 may operate at a fixed depth chosen at the time of installation, or at an adjustable depth that may for example be changed following startup or changed in response to changing conditions (e.g., changing wave, tidal, thermocline or halocline conditions, or changes in the operating efficiency of the RO membranes). In a further embodiment, system 900 may include a pressure-seeking capability to enable system 900 to increase or decrease its depth in order to obtain desired hydrostatic pressures, to optimize or adjust RO operating conditions or to optimize or adjust product water delivery.

System 900 is supplied with compressed air via airline or airlines 906 connected to one or more onshore compressors (not shown in FIG. 9). Desalinated water product is removed from system 900 via product water delivery conduit 908. System 900 includes prefilter 910 for removal of gross seawater contaminants. Filter 910 may contain one or an array of any suitable filtration devices, for example membranes, nonwoven webs, woven webs, particles, hollow or solid fibers or other filtration structures. Where an array of such filtration devices is employed, they may be configured in series or in parallel or both in series and in parallel. System 900 also includes reverse osmosis unit 912 containing one or an array of reverse osmosis membranes arranged in a preferred parallel configuration for separation of desalinated water and brine. In other embodiments, the membranes may be configured in series, or both in series and in parallel. Seawater enters system 900 via inlet screen 1002 atop prefilter 910. Airlines 914, 916 and 918 extend from airline(s) 906 and may be controlled by on-shore valves, orifice plates or (as shown in FIG. 9), by individually actuated valves. Airline 914 supplies lift air to product water delivery conduit 908 for use in directing desalinated water product through delivery conduit 908 via airlift pumping. Airline 916 supplies purge air to backflush (and if desired, via a further suitable valved or otherwise controlled injection point, to flush) prefilter 910. The use of such purge air can remove or prevent the buildup of contaminants and overcome or avoid clogging, and may be carried out continuously or at any appropriate interval or sequence. The removed contaminants may if desired be captured (for example, using a suitable hood or other capture device (not shown in FIG. 9), above screen 1002. The captured contaminants may for example be used for aquaculture or other purposes. Airline 918 supplies airlift to remove concentrated brine from reverse osmosis unit 912 via brine removal conduit 920, for dispersal at one or more locations remote from system 900, as discussed in more detail below.

Figure 10:
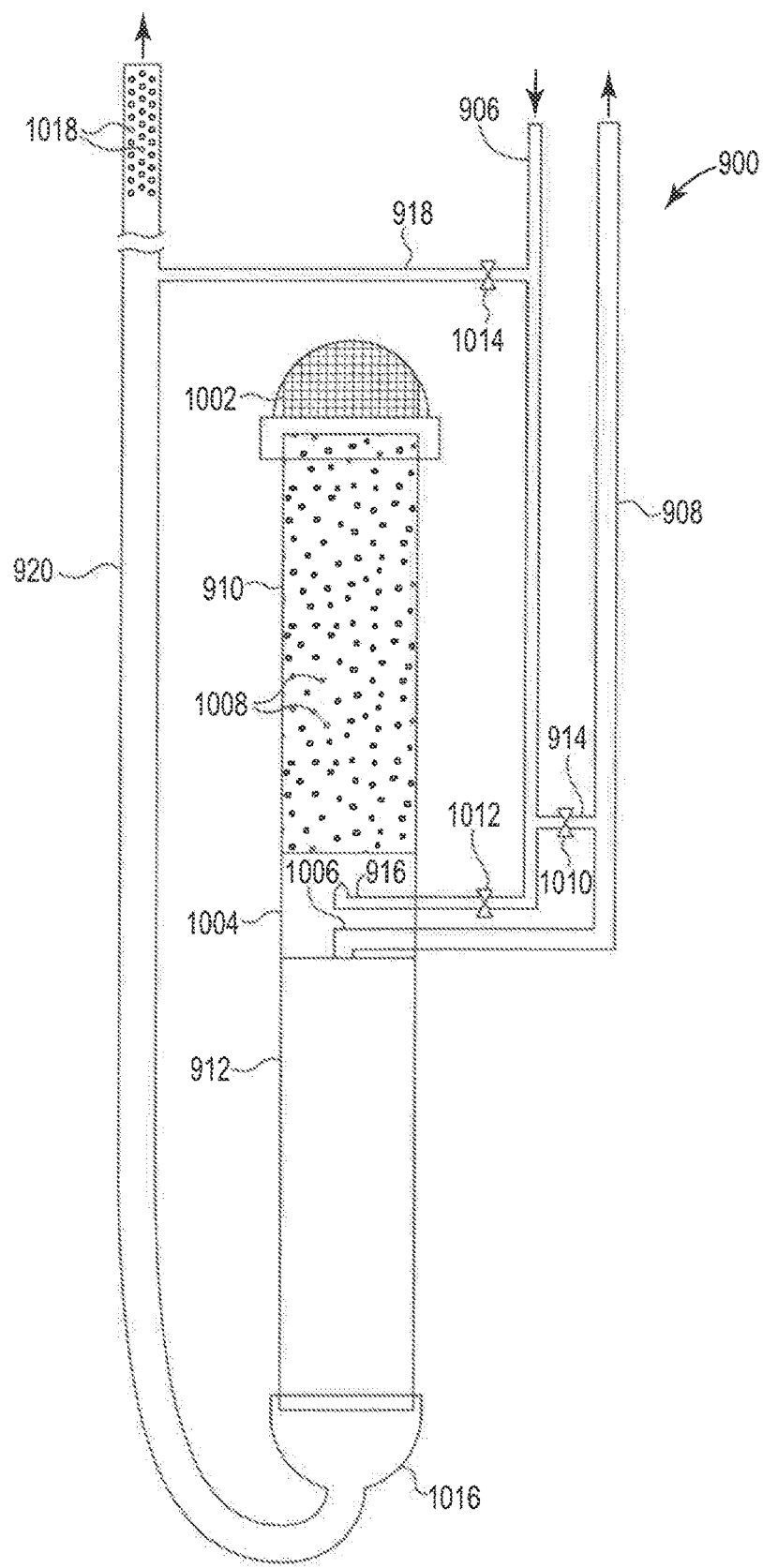

FIG. 10 shows system 900 in greater detail. Rough screen 1002 blocks the entry of fish and other large objects into system 900. Coupling 1004 joins prefilter 910 to reverse osmosis unit 912, and delivers filtered seawater to reverse osmosis unit 912. Air bubbles 1008 may be supplied from time to time or continuously beneath prefilter 910 to carry out air purging as discussed above. Fresh product water exits reverse osmosis unit 912 via collector 1006 and enters product water conduit 908, whereupon airlift (supplied from airline 906 via submerged valve 1010 and airline 914) can be used to remove the product water using an annular flow regime in a substantial portion of product water conduit 908.

Manifold 1016 collects brine from reverse osmosis unit 912 and directs it into brine removal conduit 920. Brine removal conduit 920 preferably is provided with airlift using air supplied from airline 906 via submerged valve 1014 and airline 918. As discussed above, submerged valves 1010, 1012 and 1014 can be used to regulate the flow of air through airlines 914, 916 and 918 into system 900, and may in the interest of simplicity and reduced maintenance be eliminated and replaced by onshore valves or other airflow control measures.

If desired, brine removal conduit 920 may have any other desired orientation, for example a horizontal or an oblique orientation. A vertical orientation is generally preferred, as such an orientation can reduce the energy required to disperse the brine. Brine removal conduit 920 may if desired be combined with or serve as an anchor or tether for a buoy that indicates the SRO system location.

Any desired flow regime may be used in brine removal conduit 920, for example a slug, churn or annular flow regime. A substantial portion of brine removal conduit 920 beyond (viz., above as shown in FIG. 9 and FIG. 10) airline 918 preferably includes a plurality of perforations or other openings 1018 in the sidewall of brine removal conduit 920. The openings 1018 provide brine outlets through which brine can disperse into seawater away from brine removal conduit 920. Depending on the size, shape, extent and axial orientation of such openings and the flow of brine within brine removal conduit 920, seawater may be drawn into some of the openings 1018 in brine removal conduit 920 and thereby provide brine dilution within brine removal conduit 920. The disclosed brine airlift system has several additional advantages discussed in more detail below, and in Applicant's copending International Application Publication No. WO 2018/148542 A1, filed even date herewith and entitled BRINE DISPERSAL SYSTEM, the disclosure of which is incorporated herein by reference.

Although not shown in FIG. 9 and FIG. 10, persons having ordinary skill in the art will understand that system 900 may include an electrical supply and appropriate electronic controls to operate air valves or other submerged components, measure desired operating parameters (e.g., pressures, temperatures, flow rates and the like), and to handle other electrically-driven or electrically operated equipment or other signaling needs. Preferably however the use of submerged electrical components is minimized or eliminated. The disclosed submerged optional valves may for example be operated using air pressure provided via one or more additional air supply lines, or eliminated altogether by supplying air at appropriately varied pressures from the air compressor systems, optionally together with appropriate arrangement of the respective depths at which the disclosed airlines inject air into the prefilter, product water stream or brine stream.

Figure 11:
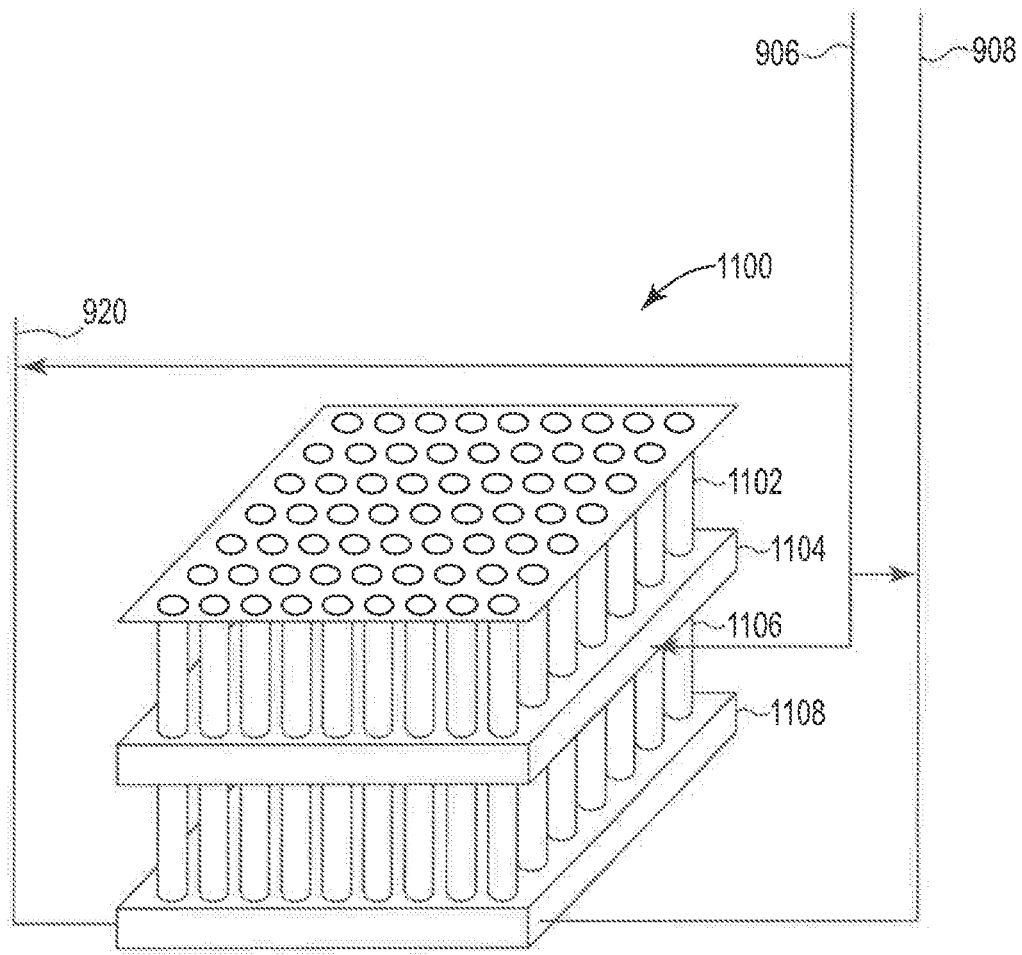
FIG. 11 is a schematic perspective view, partially cut away, of an SRO desalination system.

FIG. 11 shows a perspective, partially exploded and partially cut-away view of a prefilter and reverse osmosis assembly 1100 for use in an SRO desalination system. Assembly 1100 includes an array of prefiltration elements 1102 joined via a coupling 1104 to an array of RO elements 1106. The prefiltration elements and RO elements desirably are be provided without pressure-resistant housings. In the embodiment shown in FIG. 11, product water flows downwardly through RO elements 1106 towards collector 1108, and collector 1108 receives desalinated water from the reverse osmosis elements 1106. In the embodiment shown in FIG. 11, 49 prefiltration elements 1102 and 49 RO elements 1106 are each arranged in a 7×7 array. Other array sizes, arrangements and membrane flow directions (e.g., upward product water flow through the RO membranes as disclosed in FIG. 9 and FIG. 10, or horizontal flow) may be used as desired to suit the particular application and chosen components. Multiple such arrays may be combined in parallel to provide additional desalination capacity.

The disclosed prefiltration elements can reduce maintenance requirements. The disclosed SRO system preferably will operate at great depth, far from human hands. Some prior proposals for SRO desalination appear to assume that deep seawater is sufficiently clean to permit desalination without prefiltration. While it is true that seawater at the disclosed 680 meter operating depth is typically approximately at least 90% cleaner than surface water, the remaining 10% may represent sufficient contamination to require periodic replacement of the RO membranes to prevent or overcome clogging or fouling. The disclosed prefilter provides a one-stage and preferably a two-stage prefiltration treatment that can prolong RO membrane lifetime. By performing pretreatment at depth rather than offshore, the overall likelihood of marine life entrainment is reduced. The prefilter can be periodically or continuously back flushed or otherwise purged using air bubbles or an air/water stream to further prolong the prefilter lifetime while meanwhile further minimizing or avoiding harm to marine life. If desired, chlorine or ozone may be introduced into the prefilter airlift line, in order to disinfect the prefilter and discourage biofouling. Thus by using the relatively cleaner waters available at the disclosed preferred depths and a prefilter airline, the disclosed SRO system can significantly reduce the prefiltration step(s) and prefilter cleaning or replacement normally required in shore-based or shallow depth RO units and the accompanying capital, operating, real estate and energy requirements. In some embodiments (e.g., in appropriately clean waters or when using membranes that are less susceptible to fouling), pretreatment may be omitted entirely.

The disclosed SRO system preferably lacks submerged moving parts and especially wearing parts (e.g., pump impellers, shafts, valves and other components) that might by design or through the failure of a seal or enclosure come into contact with seawater or brine beyond their designed capability or suitability. In preferred embodiments, the disclosed SRO system operates entirely without such failure-prone submerged parts as pumps, motors and valves, is composed entirely of seawater-tolerant materials, and provides steady-state, continuous or essentially continuous RO desalination using the hydrostatic weight of the ocean above the membrane or membrane assembly to supply the pressure required to drive the pure water through the membrane while leaving most of its salts behind. Maintenance needs can accordingly be reduced by avoiding frictional sliding surfaces, pump cavitation, motor or bearing failure and other causes of wear or premature component failure.

The disclosed SRO desalination system will typically be employed with an onshore, offshore (e.g., surface platform-mounted, submerged or ship-borne) compressor unit capable of delivering clean compressed air in a quantity required to maintain the above-mentioned annular flow regime. Suitable compressor equipment is available from a variety of sources that will be familiar to persons having ordinary skill in the art. If desired, these various compressor units may be combined with one another or with reserve tanks to provide backup, auxiliary or complementary compressed air supply. For example, a submerged or surface platform-mounted compressor unit may be employed in addition to an onshore compressor unit, and any or all of these may if desired be powered in whole or in part by energy derived from waves, wind or sunlight.

Installation and startup of the disclosed SRO desalination system may for example be carried out by attaching an air supply line and the discharge water conduit to the system and then lowering the system into the ocean. The discharge water conduit preferably is able to withstand collapse pressures of at least 970 psi at its deepest reach, and if desired its upper reaches need only be configured to withstand the reduced collapse pressures present nearer the surface. The prefilter elements and especially the RO elements preferably are maintained in a vertical orientation during system installation and operation. Some prior SRO systems have mounted their RO membranes sideways. If however air bubbles are present in the RO membranes during installation or startup, damage may occur when the membrane becomes pressurized. A vertical orientation helps reduce the likelihood of such damage, as air will automatically be displaced from the RO membranes during submersion of the SRO apparatus. As the seawater hydrostatic pressure reaches a level sufficient to begin desalination (e.g., at around 2.76 MPa (400 psi), occurring at about 250 meters, for the above-mentioned FILMTEC SW30HR-380 RO elements), fresh water will begin to permeate across the membranes into the low-pressure product discharge conduit. At a preferred final operating depth of approximately 680 meters below sea level, the seawater hydrostatic pressure will be sufficient to provide an optimal pressure differential of 5.52 MPa (800 psi) across the disclosed FILMTEC membrane. At that point the SRO air supply may be turned on. Air will flow to the discharge water conduit airlift, to the brine airlift, and to the prefilter backflush line. During startup, before annular flow is achieved in the discharge water conduit, the system typically will require that air be supplied at higher than normal pressure to enable lifting the filled water column in the discharge water conduit. Desirably the compressor used during the main running phase is not called upon to provide such higher pressure directly, and instead reserve air stored at elevated pressure in one or more separate storage tanks is employed during the startup phase.

In an alternative embodiment, the discharge water conduit may be closed (for example, by an on-shore or submerged valve) during installation and submersion of the SRO apparatus. This will reduce permeation through the osmotic membranes, and will increase pressure within the discharge water conduit and reduce the extent to which it becomes filled during submersion. The result will be an increased air fraction in the discharge water conduit column before the initiation of desalination and product recovery, and a reduction in the startup air pressure that will be needed to attain a continuous annular flow regime. Stated somewhat differently, the peak air pressure otherwise required to attain a continuous annular flow regime will be reduced once the conduit is reopened.

Once an annular flow regime is attained (either following a drop in the weight of the corresponding vertical water column in the discharge water conduit due to the displacement of much of the water in that column by air, or following a reopening of the closed discharge conduit in the above-mentioned alternative embodiment), the supplied air pressure can be adjusted (e.g., reduced) to a normal operating range needed for continuous pumping of the desalinated water product through the delivery conduit. In one exemplary embodiment, a pressure of about 68 bar above the hydrostatic pressure is employed during the startup phase, and a reduced pressure of about 13 bar is employed during the subsequent main running phase when an annular flow regime has been achieved. This substantially lowers the air pressure requirement and consequently the air compressor energy consumption during the main running phase. Higher or lower air pressures may be used during the startup or main running phase is if desired. Control of the air pressure during startup or operating conditions may in some embodiments be facilitated by including an appropriate orifice or orifices in one or more of the prefilter purge airline(s), product water conduit delivery airline(s) or brine removal conduit airline(s). As discussed in more detail below, it is actually the volume of air relative to water and not the pressure that is important for attaining the desired annular flow regime operating state.

Meanwhile, as a part of the system design or the startup or operation procedures, the brine airlift supply should be set, controlled or adjusted. This may be done for example by using an orifice plate in the system design, or by using a valve (located at the surface or submerged) for control or adjustments during startup or operation. Either or both of the brine airlift pressure or air flow volume may be so set, controlled or adjusted, and doing so can provide positive control of the amount of saline (viz., feed) water flowing through the RO membranes to meet design requirements and conditions. In one embodiment, the brine airlift pressure can be set at the same pressure as the discharge airlift pressure by injecting air for the brine airlift at an appropriately higher elevation than for the discharge airlift. This allows the use of one air pressure line instead of two separate lines having different pressures, and helps prevent the accidental injection of air into the RO membranes.

Importantly, the energy required for SRO airlift is substantially less than the energy needed for a mechanical pump to do the same work. SRO with an annular flow regime airlift requires approximately one-tenth the power needed for surface-based RO using mechanical pumping to provide the primary RO pressure. The same energy comparison is applicable to SRO conducted using only hydrostatic pressure to drive the RO membranes and only mechanical pumping to deliver the product water. The disclosed annular flow regime thus provides a significant reduction in the primary operating expense for typical RO saltwater desalination, namely the electrical power or other energy required to maintain pressure across and flow through the RO membranes.

As mentioned above, attainment of the desired annular flow regime does not depend upon controlling air pressures, but rather on controlling the ratio of air to water. For a conventional airlift pump lifting liquid in a slug or churn flow regime, the air fraction typically will be about 40%. During continuous operation of the disclosed SRO apparatus, an air fraction is selected to provide an annular flow regime over a significant portion of the airlift, for example an air fraction of at least 60%, typically about 80% and in some embodiments as high as 90%, 95% or even 99%. The disclosed SRO desalination system thus employs an airlift pump operated at substantially higher air/water volumetric ratios (and thus, at higher air fractions) than those employed to attain a slug or churn flow regime. For example, the disclosed SRO apparatus may be operated using air:water volumetric ratios (as averaged along the length of the product water delivery conduit) of at least about 60:40, at least about 70:30, at least about 80:20, at least about 85:15, or at least about 90:10. The apparatus may be operated using air:water volumetric ratios as high as about 99:1, as high as about 95:5, or as high as about 91:9. The use of such air:water ratios facilitates formation of an annular flow regime (including in some embodiments flow regimes that may be identified as "wispy annular flow" or "annular with droplets") over at least a substantial length of the discharge water conduit, for example over at least the upper 20%, upper 30%, upper 40%, upper 50% or upper 60% of the discharge water conduit, and in some embodiments over at least the upper 90%, upper 80% or upper 70% of the discharge water conduit. This reduces the average density and overall weight of material in the discharge water conduit and consequently reduces backpressure at the bottom of the conduit on the low pressure side of the reverse osmosis membrane. This is especially helpful for an SRO system that relies partially or preferably wholly upon hydrostatic pressure to drive seawater through its RO membranes. Extra required depth is undesirable because in addition to having to submerge the SRO system to a greater depth, it may also be necessary to place the SRO system further from shore and consequently to incur additional expenses to lengthen the air supply line(s) and product delivery conduit. Also, if sufficient depth is not available at the chosen location, then mechanical pumping assist may be needed to attain sufficient differential pressure across the RO membranes. In other embodiments, mechanical pumping assist may be employed along with airlift in a hybrid system designed to operate at lesser depths or shorter offshore distances than those required for SRO operation using only hydrostatic pressure.

The disclosed airlift will provide surplus air at the top of the product water distribution column. Owing to the cooling effects of seawater surrounding the airline and associated product water delivery conduit, and the temperature reduction that accompanies volumetric expansion as the airlift air travels toward the surface, the surplus air represents a useful supply of chilled air that can be used for the above-mentioned cooling or heat exchange applications. The surplus air may also be reused by sending it to a compressor to provide further airlift or to reduce the required operating depth for the disclosed SRO system.

If desired, the disclosed airlift may be assisted during startup or during steady-state operation by applying a vacuum to the product delivery conduit, e.g., at or near the top of the product delivery conduit. The withdrawn air may if desired be reused for airlift or for other purposes.

Conventional onshore RO units often use treatment chemicals to neutralize the product water to an acceptable pH (for example, to a pH of about 6 to about 8). The use of airlift and an annular flow regime in the present system exposes the product water to ample amounts of air. Doing so can neutralize the product water without requiring the use of pH neutralization chemicals, thus saving money and reducing the introduction of chemicals into the product water. On the other hand, the disclosed airlift may if desired be used to provide alternative or additional methods for water treatment. For example, chlorine may be introduced into the airlift line supplying the product water delivery conduit, in order to chlorinate and disinfect the product water and discourage downstream biofouling.

For use with Dow FILMTEC and several other commercially-available RO membranes, the disclosed SRO desalination system preferably is operated at a depth of at about 680 m. Doing so will create a high-pressure (approximately 68-bar) condition on the high-pressure side of the semipermeable RO membrane. When used with a presently preferred backpressure of 13 bar or less on the discharge side of the membrane, this will result in a pressure differential across the membrane of 55 bar (approximately 800 psi) or more. In situations of higher- or lower-salinity waters, these depth and pressure values may vary. The inlet pressure will in any event normally be the ocean hydrostatic pressure at the chosen SRO operating depth.

The preferred depth and pressure values set out above may vary in systems that take advantage of future membrane developments enabling or requiring lower or higher differential pressures or higher or lower membrane backpressures. Adjustments to accommodate such developments may increase or decrease the preferred operating depth for the disclosed SRO system. For many membranes, the pressure on the low-pressure side typically will not change appreciably with depth, and consequently changing the depth of operation may suffice to adjust the differential pressure across the membrane and achieve optimal operating conditions. In a preferred embodiment, desalination in the disclosed SRO system is driven entirely by hydrostatic seawater pressure on the high-pressure side of the RO membranes, and a low-pressure condition is maintained on the outlet or product side of the membranes by a flow of compressed air supplied from the surface, at a flow rate and pressure sufficient to create an annular flow regime for air and water over a significant portion of the delivery conduit and adequately evacuate the desalinated water product. Once such a system is at the proper depth and air is flowing at the correct volume and pressure, the system preferably continuously desalinates seawater and delivers pure water to the surface with no moving parts below the waterline that would be subject to wear or breakage.

The disclosed SRO system may if desired be operated at depths less than 680 m. If doing so using RO membranes whose pressure and pressure differential requirements are like those of the above-mentioned Dow FILMTEC membrane elements, then it may be necessary to provide a suitable pressure assist on the inlet side of the RO membranes (or a suitable vacuum assist on the outlet side) in order to achieve efficient desalination. Such an assist may be accomplished using supplied air pressure, the above-mentioned vacuum, or if need be by using a submerged mechanical pump. Operating depths may if desired be increased beyond the depth required for pump-free desalination (e.g., beyond 680 m), with a corresponding decrease in the required air fraction to achieve sufficient operating differential pressure. Exemplary depths for operation of the disclosed SRO desalination system are for example from just below the surface (e.g., from about 10 m), from about 100 m, from about 300 m, or from about 500 m, and up to about 2,000 m, up to about 1,500 m or up to about 1,000 m. Preferred depths are from just below the surface to about 1500 m depth. Near the surface, the hydrostatic pressure of the ocean will need to be augmented by mechanical pumping to provide the trans-membrane pressure differential needed for reverse osmosis. The marginal (viz., incremental) energy benefits of increased depth are greatest near the surface. As depth increases, the energy benefits accruing from mechanical pumping rapidly decrease, making this an unattractive approach in view of the accompanying increased complexity of an RO system employing both hydrostatic pressure and mechanical pumping. This has been however an approach taken in some previous SRO designs.

In one preferred embodiment, the disclosed SRO apparatus is deployed in an ocean trench or dropoff (for example, the Monterey Submarine Canyon, Puerto Rico Trench, Ryukyu Trench and other accessible deep sea sites that will be familiar to persons having ordinary skill in the art), near a populated area in need of desalinated water. The SRO inlet surfaces need not be placed at depth of the trench floor, and may instead be positioned along the trench wall at a depth sufficient to enable the use of hydrostatic pressure to drive seawater through the osmotic membranes.

An optimal operating depth may be determined based on airlift air fraction and membrane operating characteristics. When using the disclosed Dow FILMTEC membrane elements, a 680 m depth and an 80% air fraction represent preferred choices. Greater depths will permit the use of smaller air fraction values (for example, at 1500 m the required air fraction to attain an annular flow regime is about 20%), but will also lessen the number of available deep water locations at which the disclosed SRO system may be deployed.

Operation at appropriate depths can greatly reduce or eliminate the likelihood of algal bloom contamination, which can cause conventional shore-based plants with shallow water intakes to shut down in order to avoid toxins and clogging. Operation at such depths can also minimize or eliminate the loss of marine life, as most marine organisms are found within the photic zone (depending upon water clarity, corresponding to depths up to about 200 m) and thus at deeper depths will not be drawn into the SRO system intake or against an intake screen.

The cold feedwater (e.g., 5-10° C. water) typically encountered at the above-mentioned recommended SRO operating depths can provide several useful advantages. For example, the feedwater is relatively free from critical organic and inorganic contaminants. It carries almost no organic matter or chlorophyll and thus contains virtually no bacteria, while still retaining valuable nutrients from the ionic minerals and trace elements present at the disclosed pressures and depths. A further advantage arises in connection with boron removal, which is important for irrigation water and health purposes. Boron is present in seawater, and at conventional RO operating temperatures such as are used in onshore RO units, enough boron may pass through the RO membrane to inhibit the growth of plants. Boron removal to agricultural standards of 0.5 mg/liter in a conventional RO facility may require double treatment of the water using a second RO pass, thus increasing capital and operating costs. Boron removal by reverse osmosis is however highly temperature-dependent, with lower amounts of boron and its salts passing through the membranes at colder temperatures. For example, borate passage may be reduced by several percentage points for every reduction of 10° C. in feedwater temperature. Placement of the disclosed SRO device in cold deep water consequently may help produce higher-quality desalinated water by improving the removal of boron and its salts while saving the energy, capital, and maintenance costs required for a double treatment system. Cold feedwater can also result in less overall salt passage through the membrane, allowing for remineralization of the product water for taste reasons while maintaining a low level of TDS to meet regulatory requirements. In addition, the use of cold feedwater can nearly eliminate the scaling of membranes by mineral deposition, as measured by the Langelier Index. Membrane scaling can be a problem with shore-based, shallow-intake RO units, and reduces system efficiency and lifetime. In the disclosed SRO system, scaling is minimized because $CO_2$ will tend to be in equilibrium at the 5-10° C. temperatures at which the RO membranes may be operating. This can eliminate the need for the anti-scaling chemicals that often are employed in shore-based RO units. Biofilm growth, another form of membrane fouling, is also temperature-dependent, with more biofilm forming at warmer temperatures, and less at the low-temperature operating environment of the disclosed SRO system. Biological activity and hence biological fouling are thus reduced due to the use of water from a region having no light, low oxygen, and cold water temperatures.

In some prior SRO designs, especially those that rely on a pressure pump to force seawater through the membranes, thick pressure-resistant vessels are employed to contain the high pressures needed for membrane separation. In preferred embodiments of the present SRO desalination system, the prefiltration elements and RO membranes will not require pressure-resistant vessels, as they will already be immersed at a sufficiently high pressure in the fluid to be purified. Desirably the disclosed SRO system merely maintains a sufficiently low pressure on the membrane discharge side, and a sufficient inlet side-outlet side pressure differential, so as to allow proper membrane operation without the use of a surrounding pressure-resistant vessel.

The disclosed SRO system can produce significantly lower concentrations of salt in the brine stream than will be the case for conventional RO, as the elimination of the requirement for pressure vessels permits the RO membranes to be arrayed in parallel rather than the typical seawater desalination industry practice of 5-7 membranes in a serial arrangement. A parallel array eliminates a common failure point in conventional RO systems, namely the o-ring interconnections between membranes. A parallel arrangement also permits higher product water production per membrane. In addition, a parallel membrane arrangement creates much less salty brine than a train of single membranes operating in series, and this salinity can be adjusted by adjusting the brine airlift operating parameters. The disclosed SRO system's ability to achieve low brine salinity would be beneficial to sea life and would allow easier brine dilution. For example, using seawater containing 35,000 ppm TDS, the disclosed system may provide brine containing 38,043 ppm TDS (a 9% increase) versus the near-doubling in discharge stream salinity that may arise using conventional serially-configured onshore RO.

Disposal of the brine steam may as discussed above be carried out using an airlift and a brine dispersal conduit with openings, so as to remove brine from the disclosed system and disperse it into seawater into two and more preferably into three dimensions. In preferred embodiments the brine is dispersed into one or more substantial vertical portions of a water column or columns above or remote from the disclosed SRO apparatus. Doing so can avoid the localized discharge of concentrated brine dispersed by high-pressure point-source diffusers as commonly used to disperse RO brine today, and the possible harm to marine life from high salinity or diffuser shear forces. The brine removal conduit may for example be an upwardly-extending conduit supplied with air at a height at or above the RO membranes, and preferably at or above the height at which the injection air pressure in the brine removal conduit and the operating pressure of the product delivery conduit are equalized. If desired, more than one air introduction (e.g., air injection) point may be employed. The air introduction point(s) desirably are located above the RO membranes so as to discourage the accidental introduction of air into the RO membranes. The air introduction point(s) may if desired be located above, below or alongside the prefilter, or in any combination thereof, with higher introduction points typically requiring less energy to operate the associated brine airlift, and lower introduction points providing a greater conduit length along which dilution, oxygenation or dispersion may take place. The brine removal conduit preferably rises vertically or upwardly away from the air introduction point(s) and terminates at a lesser depth than the air introduction point(s) so as to facilitate airlift of brine within the brine removal conduit. The brine removal conduit preferably has a substantial length beyond the air introduction point, e.g., at least 5 meters, at least 10 meters, at least 20 meters, at least 30 meters, at least 50 meters, at least 100 meters, at least 500 meters or at least 1,000 meters. If desired, the brine removal conduit may divide or subdivide into a plurality of preferably upwardly-directed arms each of which may carry airlifted brine and disperse it into the surrounding seawater.

The brine-dispersing portion of the brine removal conduit preferably contains a plurality of perforations or other openings in the conduit sidewall (or even one-way or other valves if desired) that provide brine outlets. The brine outlets may be located below and more preferably are located above the air introduction point(s). The outlets may disperse brine at a variety of depths, for example at depths above, below or both above and below a thermocline or halocline. The disclosed brine outlets are desirably sized, positioned and oriented to allow the dispersion of brine into the surrounding seawater and well away from the brine removal conduit. The brine outlets preferably are arranged over a substantial length along the conduit (and more preferably are arranged over a substantial vertical portion of a water column) of at least 5 meters, and in some embodiments, at least 10 meters, at least 20 meters, at least 30 meters, at least 50 meters, at least 100 meters, at least 500 meters or at least 1,000 meters. A variety of brine outlet opening shapes may be employed, including circular holes, slots, polygons, tapered ducts and other shapes. Vanes or other deflectors may be positioned within the brine removal conduit to add turbulence to or to direct the brine through brine outlets. Brine can also be expelled from the brine outlets due to the expansion of rising air within the brine removal conduit. If desired, some of the disclosed openings may be sized, oriented or positioned to allow diluting seawater to be drawn into the moving brine stream within the conduit, e.g., via the Venturi effect, and thereby serve as brine-diluting seawater inlets. Whether used to expel brine from the conduit or to draw diluting seawater into the conduit, the disclosed openings may extend along a substantial extent (for example, at least 1%, at least 2%, at least 3%, at least 4%, at least 5%, at least 10%, at least 20%, at least 30% or at least 40%) of the brine removal conduit length beyond the first air introduction point. The size, orientation, frequency and positioning of the disclosed openings may if desired vary along the length of the conduit, and may for example represent larger openings at distances close to the first air introduction point and smaller openings at distances further from the desalination apparatus, or vice versa. One or more portions along the length of the brine removal conduit after the first air introduction point may be free of openings, for example to allow for enhanced oxygenation of moving brine within such portion. The furthest (and preferably uppermost) end(s) of the brine removal conduit may be open, partially closed, or closed. Preferably there are sufficient brine outlet openings to disperse the oxygenated brine stream over a larger area (viz., into a larger volume of seawater) than would be obtained using point-source diffusers. In addition, the diffusion flow through the brine outlets preferably is not highly pressurized and thus does not create shear forces that might harm marine life.

The extent to which the brine is diluted, oxygenated or dispersed may be controlled or influenced by a number of factors, including the number, size, shape and axial orientation of the disclosed openings, the pressure and volume of introduced brine airlift air, the respective velocities of the disclosed brine and brine airlift flows, and the presence of turbulence at or after the air introduction point(s). The brine may if desired be dispersed above, below or both above and below a thermocline or halocline.

The disclosed combination of an airlift and a brine delivery conduit with appropriate openings can permit removal, dilution, oxygenation and dispersal of brine produced by the SRO system over a substantial area remote from the SRO system. This can for example permit dispersal of brine high above the SRO system, enabling the system to rest on the ocean floor without creating an unsafe environmental condition due to brine, which is denser than seawater, pooling on the seafloor. Such pooled brine could harm benthic-dwelling marine life, for example by causing hypersaline conditions on the ocean floor. Use of an airlift pump to disperse the brine can also save energy compared to the use of marine outfall lines or pressurized brine diffusers commonly employed with shore-based RO plants. In addition, the disclosed airlift brine diffusion system can diffuse brine into a much larger area (viz., volume of nearby water) than is the case for typical marine outfall lines or pressurized brine diffusers. The disclosed oxygenation can also reduce the incidence of naturally-occurring or otherwise induced hypoxia or dead zones in nearby seawater.

In a further preferred embodiment, the volume or pressure of airlift air supplied to the disclosed brine removal conduit can be designed, set or adjusted so that during or following startup (e.g., during SRO operation) the brine airlift air will provide positive control of the volume of saline water flowing through the RO membranes. This can help prevent polarization at the boundary layer near the membrane surface, and will also discourage membrane fouling or scaling. In addition, such control can facilitate adjustment of the salinity of the brine stream, allow modification (e.g., reduction) of the brine stream airlift demand, or allow for sizing or resizing of pretreatment conditions and capacities. In an especially preferred embodiment, the volume or pressure of brine airlift air is designed, set or adjusted to optimize the RO membrane product water recovery rate and membrane health.

Expressed in terms of the air:brine volumetric ratio (determined shortly after the point at which air is injected into the brine removal conduit, and before taking into account the possible entry into the conduit of seawater dilution streams via the disclosed openings), air:brine ratios of at least about 1:99, at least about 5:95, at least about 10:90, at least about 15:85 or at least about 20:80 may be employed. The air:brine ratio may under some conditions be as high as about 99:1, as high as about 95:5, or as high as about 90:10 but under normal operating conditions typically will be less, for example up to about 60:40 or up to about 50:50.

In comparison to conventional marine outfall lines or multiport diffusers, the disclosed brine dispersal system can provide improved brine dispersal with reduced capital and energy requirements. If the disclosed brine airlift system is also used to set or adjust the volume of saline water flowing through the RO membranes, then SRO system performance can be controlled at much lower capital cost than would typically be required by the variable frequency drives and seawater pumps typically used to control the pressure and flow rate of seawater through RO membranes in conventional onshore systems.

A principal benefit of the overall disclosed SRO system is its significantly reduced energy requirements. The mechanical pressurization of process water, the largest source of energy use in conventional RO desalination, can be eliminated. For the disclosed exemplary SRO system operating with Dow FILMTEC membrane elements at approximately 680 m depth, and with airflow adjusted to an 80% air fraction to provide an annular flow regime in the discharge water conduit and eliminate the need for a mechanical pump to aid product flow, the energy consumption may be estimated. As discussed above, the current average energy consumption for a shore-based RO unit is approximately 13.5 kWh/3785 liters (1,000 US gallons). The energy consumption and associated greenhouse gas production to produce desalinated seawater using the disclosed SRO system may be significantly reduced. The associated capital expenditures and operating expenditures can also be significantly reduced, especially in comparison with those required for onshore RO desalination.

These and other advantages of the disclosed SRO system thus may include one or more of:

Greatly reduced power consumption.

Reduced greenhouse gas emissions to desalinate a given quantity of water.

Low temperature permeate and surplus airlift air each provide an additional thermal value stream that may be used for cooling, heat exchange, limiting or ameliorating the effects of atmospheric warming, or further reducing greenhouse gas emissions.

Elimination of both onshore and offshore high pressure water pumps.

Elimination of the artificial high-pressure environment used in conventional RO and the accompanying pressure vessels, high pressure piping, and fittings.

Reduced operation and maintenance requirements through elimination of parts, and especially the reduction of highly-pressurized connections.

Greatly reduced number of parts requiring expensive alloys and other exotic materials resistant to seawater corrosion.

Reduced or eliminated pretreatment equipment and its associated operating capital and labor.

Reduced damage to RO membranes from mechanical pump vibrations.

Reduced localized brine emission.

Parallel rather than series membrane configurations with even lower-salinity brine discharge.

Increased oxygenation of nearby seawater and reduction in hypoxia.

Pipelines to shore that are over 50% smaller, as only product water is sent onshore.

Reduced boron content in desalinated water, making it suitable for agriculture without further treatment.

Reduced bacterial content and bacterial fouling due to the use of deep-sea intake water that is relatively free of undesirable organic or inorganic contaminants.

Reduced susceptibility to desalination disruption caused by algal blooms.

Virtual invisibility from shore.

Reduced susceptibility to destruction due to adverse weather events, fires, terrorism or volcanic eruptions.

Reductions by as much as 90% in required onshore real estate.

Suitability for deployment as an "Ocean Well" that can provide a sustained freshwater supply without aquifer depletion.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A desalination and cooling system comprising a submerged offshore reverse osmosis desalination apparatus having:
    a) one or more submerged osmotic membranes each having an inlet surface supplied with seawater at least partially under hydrostatic pressure and an outlet surface that provides desalinated product water containing less than 0.5 parts per thousand (ppt) dissolved inorganic salts by weight to a submerged product water collector in fluid communication with the outlet surface(s),
    b) an at least partially submerged water discharge conduit in fluid communication with the collector and providing a pipeline that delivers the desalinated water to shore; and
    an onshore heat exchanger in fluid communication with the water discharge conduit,
    wherein the desalinated product water and onshore heat exchanger provide or improve the cooling of an onshore Sea Water Air Conditioning (SWAC) system or data center.

2. A system according to claim 1 wherein the submerged apparatus relies wholly upon hydrostatic pressure to drive seawater through the osmotic membranes.

3. A system according to claim 1 wherein the submerged apparatus does not include submerged frictional sliding surfaces, a submerged mechanical pump or a submerged valve.

4. A desalination and cooling system comprising a submerged offshore reverse osmosis desalination apparatus having:
    a) one or more submerged osmotic membranes each having an inlet surface supplied with seawater at least partially under hydrostatic pressure and an outlet surface that provides desalinated water to a submerged product water collector in fluid communication with the outlet surface(s),
    b) an at least partially submerged water discharge conduit in fluid communication with the collector and providing a pipeline that delivers the desalinated water to shore; and
    an onshore cooler or heat exchanger in fluid communication with the water discharge conduit,
    wherein the product water and onshore cooler or heat exchanger provide or improve the cooling of a Sea Water Air Conditioning (SWAC) system, power plant, data center, Ocean Thermal Energy Conversion (OTEC) system, or Rankine Cycle heat engine, and
    wherein the submerged apparatus includes an air supply for removing water from the collector via airlift, and an airflow valve that controls airflow into the collector or into the conduit so that the desalinated water is lifted by supplied air in an annular flow regime over 10% or more of the airlift depth.

5. A system according to claim 4 wherein the supplied air lifts desalinated water from the collector through the discharge water conduit using an air fraction of at least about 60%.

6. A system according to claim 4 wherein the supplied air lifts desalinated water from the collector through the discharge water conduit using an air fraction of at least about 80%.

7. A system according to claim 4 wherein the supplied air lifts desalinated water from the collector through the discharge water conduit at an air:water ratio sufficient to provide an annular flow regime over at least the upper 20% of the discharge water conduit.

8. A system according to claim 4 wherein when carrying out continuous desalination and continuous airlift, the backpressure downstream from the osmotic membranes, at the water discharge conduit, is less than about 290 psi (20 bar).

9. A system according to claim 1 wherein the osmotic membranes are not encased in a surrounding pressure-resistant housing.

10. A system according to claim 1 wherein the desalinated product water and onshore heat exchanger provide or improve the cooling of an onshore Sea Water Air Conditioning (SWAC) system.

11. A system according to claim 1 wherein the desalinated product water and onshore heat exchanger provide or improve the cooling of an onshore data center.

12. A method for desalination and cooling, the method comprising operating a submerged reverse osmosis desalination apparatus having:
a) one or more submerged osmotic membranes each having an inlet surface supplied with saltwater at least partially under hydrostatic pressure and an outlet surface that provides desalinated product water containing less than 0.5 parts per thousand (ppt) dissolved inorganic salts by weight to a submerged product water collector in fluid communication with the outlet surface(s),
b) an at least partially submerged water discharge conduit in fluid communication with the collector and providing a pipeline that delivers the desalinated water to shore; and
using the desalinated product water in an onshore heat exchanger in fluid communication with the water discharge conduit to provide or improve the cooling of an onshore Sea Water Air Conditioning (SWAC) system or data center.

13. A method according to claim 12 wherein the submerged apparatus relies wholly upon hydrostatic pressure to drive seawater through the osmotic membranes.

14. A method for desalination and cooling, the method comprising operating a submerged reverse osmosis desalination apparatus having:
a) one or more submerged osmotic membranes each having an inlet surface supplied with saltwater at least partially under hydrostatic pressure and an outlet surface that provides desalinated water to a submerged product water collector in fluid communication with the outlet surface(s),
b) an at least partially submerged water discharge conduit in fluid communication with the collector and providing a pipeline that delivers the desalinated water to shore; and
using the desalinated water in an onshore cooler or heat exchanger in fluid communication with the water discharge conduit to provide or improve the cooling of a Sea Water Air Conditioning (SWAC) system, power plant, data center, Ocean Thermal Energy Conversion (OTEC) system, or Rankine Cycle heat engine,
wherein the submerged apparatus includes an air supply for removing water from the collector via airlift, and an airflow valve that controls airflow into the collector or into the conduit so that the desalinated water is lifted by supplied air in an annular flow regime over 10% or more of the airlift depth.

15. A method according to claim 14 wherein the supplied air lifts desalinated water from the collector through the discharge water conduit using an air fraction of at least about 60%.

16. A method according to claim 14 wherein the supplied air lifts desalinated water from the collector through the discharge water conduit at an air:water ratio sufficient to provide an annular flow regime over at least the upper 20% of the discharge water conduit.

17. A method according to claim 14 wherein when carrying out continuous desalination and continuous airlift, the backpressure downstream from the osmotic membranes, at the water discharge conduit, is less than about 290 psi (20 bar).

18. A method according to claim 12 wherein the osmotic membranes are not encased in a surrounding pressure-resistant housing.

19. A method according to claim 12 wherein the desalinated product water and onshore heat exchanger provide or improve the cooling of an onshore Sea Water Air Conditioning (SWAC) system.

20. A method according to claim 12 wherein the desalinated product water and onshore heat exchanger provide or improve the cooling of an onshore data center.

21. A method according to claim 12 further comprising supplying desalinated product water and from the heat exchanger to a potable water storage system.

22. A system according to claim 1 wherein the system supplies desalinated water from the heat exchanger to a potable water storage system.

* * * * *